United States Patent
Kenner et al.

(10) Patent No.: US 6,269,394 B1
(45) Date of Patent: Jul. 31, 2001

(54) SYSTEM AND METHOD FOR DELIVERY OF VIDEO DATA OVER A COMPUTER NETWORK

(76) Inventors: Brian Kenner, 1430 Walnut Creek Dr., Encinitas, CA (US) 82024; Harry Gruber, 6881 Via Westa Mansa Ranch, San Diego, CA (US) 92067

( * ) Notice: Subject to any disclaimer, the term of this patent is extended or adjusted under 35 U.S.C. 154(b) by 0 days.

(21) Appl. No.: 09/212,890

(22) Filed: Dec. 16, 1998

Related U.S. Application Data

(60) Division of application No. 08/660,540, filed on Jun. 7, 1996, now Pat. No. 5,956,716, which is a continuation-in-part of application No. 08/486,517, filed on Jun. 7, 1995.

(51) Int. Cl.⁷ ................................................. G06F 13/00
(52) U.S. Cl. .............................................................. 709/217
(58) Field of Search .................................... 709/217, 218

(56) References Cited

U.S. PATENT DOCUMENTS

| | | | |
|---|---|---|---|
| 5,421,031 | * | 5/1995 | De Bey .................................. 455/5.1 |
| 5,701,582 | * | 12/1997 | DeBey .................................. 345/328 |
| 5,734,719 | * | 3/1998 | Tsevdos et al. ....................... 700/234 |
| 5,884,028 | * | 3/1999 | Kindell et al. ........................ 709/234 |
| 5,914,712 | * | 6/1999 | Sartain et al. ........................ 345/327 |

OTHER PUBLICATIONS

Weiss et al. "Composition and Search with a Video Algerbra", IEEE Multimedia, vol. 2, Issue 1, Sping 1995, pp. 12–25.*

Ito et al. "A Video Server Using ATM Switching Technology", Multimedia Communications, 1994, 5th IEEE COMSOC International Workshop on Multimedia, PP 3/4/1–3/4/6, May 16–19, 1994.*

Lippman "The Distributed Media Bank", Proceedings of the 1st International Workshop Community Networking Integrated Multimedia Services to the Home, Jul. 1994, pp. 99–106.*

Berra et al. "Architecture for Distributed Multimedia Database Systems" Computer Comunications, vol. 13, No. 4, May 1990, pp. 217–231.*

Little, "Selection and Dissemination or Digital Video via the Virtual Video Browser", Multimedia Tools and Applications, Jun. 1, 1995, pp. 149–172.*

Informedia (tm) Digital Video Library: Integrated Speech, Inage and Landuage Understanding for Creation and Exploration of Digital Video Libraries, Carnigie Mellon University, Computer Science Department,http://www.informedia.cs.cmu.edu/info/im–proposal.h.*

* cited by examiner

Primary Examiner—Jack Choules

(57) ABSTRACT

A video clip storage and retrieval system whereby video clips, stored locally and/or at a more remote location, can be requested and retrieved by a user at the user's multimedia terminal. When the user requests a desired video clip, the request is processed by a primary index manager ("PIM") via a Local Search and Retrieval Unit ("SRU"). Before the message is communicated to the PIM, the local SRU checks its own storage to see whether the requested video clips are available locally. If some of the video clips are local, the local SRU still forwards the request to the PIM so that the PIM may determine specific video clip usage. The PIM determines the extended SRU where the audio-visual data is stored and passes this information to a Data Sequencing Interface ("DSI"). The DSI collects the video clips and downloads the clips to the user's terminal. The user may then view, copy, or print the video clip as desired. In a preferred embodiment, a distributed digital video clip delivery system, according to the invention, provides video clips stored at local and/or remote locations, which can be requested from the Internet and retrieved at the user's multimedia terminal. When the user requests a desired video clip shown on a Web page, the request is diverted to a primary index manager ("PIM"). The PIM attempts to locate the closest server containing the requested clip, from which the download is completed. The system further includes means for uploading and distributing clips to geographically diverse servers, dynamic load balancing, subscription management mechanisms, and protection means to discourage unauthorized duplication of video clips.

5 Claims, 4 Drawing Sheets

SYSTEM AND METHOD FOR DELIVERY OF VIDEO DATA OVER A COMPUTER NETWORK

This application is a division of application Ser. No. 08/660,540, filed Jun. 7, 1996 now U.S. Pat. No. 5,956,116, which is a continuation-in-part of Ser. No. 08/486,517, filed Jun. 7, 1995.

BACKGROUND OF THE INVENTION

The invention relates to a distributed audio/video clip storage and retrieval system, and more particularly, to a system whereby video material, stored locally and at a remote location, can be requested and retrieved at a user's multimedia terminal with or without sound and associated database information. In a preferred embodiment, the invention provided a system whereby remotely stored audio and video content can be requested and retrieved from a server selected so as to maximize network capacity and minimize transmission delays.

The Internet is a loose network of connected computers spread throughout the world. A message can be sent from any computer on the Internet to any other by specifying a destination address and passing the message from computer to computer via a series of "hops." Each computer, or "node," on the Internet has a unique Internet address. When an intermediate computer receives a message in transit, the computer checks the intended destination of the message and passes it along accordingly.

The Internet is growing, in terms of both size and sophistication, at a rapid rate. In the past, most users of the Internet were academic, research, or institutional users; the Internet was primarily used at that time to transmit and receive electronic mail and network news and to allow transfer of computer files.

However, since the introduction of the World Wide Web (also known as the "Web" or the "WWW") several years ago, the Internet has begun to host increasing amounts of other types of data of general interest, namely representations of images, articles, etc.

The Web presents a graphical user interface to the Internet. "Web pages," often consisting primarily of text and graphical material, are stored on numerous computers, known as "Web servers," throughout the Internet. These Web pages are generally described, in terms of layout and content, by way of a language known as "HTML" (HyperText Markup Language). Any particular computer linked to the Internet can store one or more Web pages, i.e. computer files in HTML format, for access by users.

A software program known as a "browser" can be used to access and view Web pages across the Internet by specifying the location (i.e. Internet address) of the desired Web page, or more commonly, by "hotlinking" to Web pages. Common browsers are Lynx, NCSA Mosaic, and Netscape Navigator. The desired Web page is specified by a uniform resource locator ("URL"), indicating the precise location of the HTML file in the format "http://internet.address/directory/filename.html".

Hotlinking is accomplished as follows. The user first accesses a Web page having a known address, often on the computer located at the user's ISP (Internet Service Provider). The ISP is the organization providing Internet connectivity to the user. That Web page can contain, in addition to textual and visual data specified in HTML format, "links," or embedded information (in the form of URLs) pointing to the Internet addresses of other Web pages, often on other computers throughout the Internet. The user, by selecting a link (often by pointing and clicking with a mouse), can then access other Web pages, which can in turn contain further data and/or additional links. When a Web page is accessed, its information is transmitted from the remote computer, wherever in the world it may be located, across the Internet, to the user.

In recent times, the Web has begun to host highly sophisticated types of multimedia content, such as audio and video data. Various extensions to HTML, such as Netscape's EMBED tag, allow references to other data to be embedded into Web pages. Some browsers are not capable of handling data other than text and images. Other browsers can handle the data in various ways. NCSA Mosaic, for example, handles references to unknown types of data by allowing the data to be downloaded to the user's computer, and then optionally invoking an external program to view or manipulate the data. Recent releases of Netscape Navigator take the concept one step further: a browser extension, or "plug-in," can be automatically invoked to handle the data as it is received from the remote Web page. Other means, such as network program "applets" written in the Java language (or a similar language), can be used to extend the functionality of the browser environment or network.

Compared to first generation Web content, namely text and still images, audio and video data have extremely high storage and bandwidth requirements. In particular, video files can be very large, from approximately 10 megabytes to 10 gigabytes. In order to play video files at speeds approaching their recorded rate at a user's terminal, the files have to be delivered at a fast, constant speed. Too slow, and the image plays back slower than originally recorded. If the speed is uneven, then the video appears jerky, like an old-time movie. At present, it is difficult, if not impossible, to provide sustained high-speed transmission of large files over a multi-node link on the Internet. Because the data is often transferred from afar, many factors can cause the delay or even loss of parts or all of a transmission.

This attribute, combined with the rapid growth of the Web and the Internet in general, has led to several problems. There is now a high and increasing volume of Internet traffic caused by Web page access, and the demand for bandwidth already exceeds supply.

Furthermore, certain content on the Web is extremely popular. Because current Internet technology provides Web pages from specific or "dedicated" remote site or servers, the most popular sites are often overloaded. Furthermore, according to current Internet technology, each response to a user request is generally transmitted separately. In other words, if one hundred users request transmission of the same Web page at the same time, one hundred separate transmissions must be made to these users. Because many of these popular Web pages are often being transmitted across many nodes on the Internet, there can be substantial duplication, delays and lost requests, for both the requested data and other, unrelated data being transmitted over the same routes. If a Web server containing video data receives many simultaneous requests for its ability to transfer all of the files at full speed is impaired.

Accordingly, a need exists for a system capable of providing improved access to audio/video content on the Internet or another general purpose network. Such a system would take steps to ensure that content is delivered without delay or interruption to all users requesting it.

The prior art is primarily directed towards text or image database providers, and so-called "video on demand". These systems are not designed to store text and video or audio-visual data across multiple computer systems in a distributed network. The "video on demand" concept is based primarily on a host-client architecture for downloading real-time audio-visual data, in very large amounts at a very high speed. Such systems aim, for example, to provide full-length movies, with sound, to on-line subscribers. Typically, remote users communicate with large main-frame servers containing the audio-visual data. The host-client architecture of such systems stems from the desire to eliminate bandwidth limiting elements in the system by locating the video data solely on the provider's high-capacity system. The provider must then insure that hardware and software used to distribute this data is capable of the very high storage and transmission rates required, and is virtually error free, so that no perceivable data is corrupted or lost.

Known and proposed "video on demand" systems involve expensive and sophisticated computer and communication systems which are adapted to feed full length movies to attached subscribers "on demand." Such systems use a massively parallel computing architecture, in an attempt to adapt the multi-processing computing system to manage the monumental video data delivery requirements of hundreds of simultaneous users. Each multi-processing computer is a single "mainframe" computer and operating system with numerous intricately interconnected individual microprocessors. The massively parallel computers also have very high speed internal data buses with the capability of sustaining a significant but fixed level of internal data traffic.

Massively parallel systems present three distinct disadvantages: (1) reliability, (2) cost, and (3) they are not scalable. Since video data is highly storage intensive, a very large number of hard drives are required to sustain the system. This requirement substantially increases cost. Further, because the hard drive is generally the most unreliable aspect of any computing system, using a large number of hard drives contributes significantly to making the overall system more unreliable. Also, due to the centralized systems basic structure, it is not scalable.

Another system employing large mainframe servers to store the audiovisual data for delivery to a small number of users depends on reducing hard drive throughput by developing specialized hard drive interface software. This software determines how the computer's operating system uses the computer's hard drive. For example, multiple blocks of related data can always stored sequentially, instead of randomly. Although this may lead to more effective data throughput rates, such systems have the ability to accommodate only about 40 simultaneous users, and are geared to in house, small scale, video distribution.

A limited or partial "distributed" architecture has been proposed, which would link multiple personal computers together in order to fashion a much larger monolithic functional unit. In this system, video data is distributed only to build a single, much larger source of digital video information. For example, a long video is assembled "on the fly" from separately stored pieces on different machines. Such a system might subsequently use ATM switch technology to merge the output of this array of computers into one or more continuous video streams.

By contrast, the invention provides a true or complete distributed architecture with increased reliability and the capability of supporting thousands of simultaneously attached users, at a fraction of the cost of the massively parallel system. In a preferred embodiment, the invention uses the existing Internet infrastructure, in conjunction with a network architecture as described herein, to achieve rapid and efficient delivery of audio/visual content to end users.

The invention not only distributes unlike databases (for example, a related but distinct "text database" and "audio-visual database") across the assorted computing and communication devices, but it also partitions and distributes data in a manner which maximizes the performance of the network as a whole.

In one embodiment of the invention, the user, a real estate agent, has the capability of receiving up-to-date audio-visual information about a listed property. Presently, a real estate agent spends hours researching relevant aspects of available property, to include, inspecting the property, taking photographs of the property, and accumulating information about the property. In fact, the typical agent sees less than 50 percent of the new homes listed because of time constraints. Additional time and effort is spent ascertaining the prospective buyer's desires, introducing the buyer to the range of communities available within a chosen region, researching properties that the potential buyer may be interested in, and then showing these properties to the potential buyer.

According to the invention, a realtor's time will be more effectively used on activities directly related to selling property, and not on time intensive, activities necessary to stay abreast with market conditions. For example, by being able to view the property on a video terminal the realtor will reduce significantly the time spent researching potential properties. The time spent visiting properties with the potential buyer is likewise reduced by being able to introduce the property to the buyer via the video clip. This allows the realtor to devote more time to closings and other administrative duties associated with selling the property. Also, having the video retrieval capability allows the realtor to constantly refresh the customer's memory without having to revisit the property.

SUMMARY OF THE INVENTION

The invention is directed to a video clip storage and retrieval system whereby the user receives comprehensive data collected from one or more databases by request from a user's multimedia terminal. The comprehensive data is provided in the form of selected video clips coupled with corresponding database information.

The video clip retrieval system is a distributed computer system or network whereby video clips and text information, stored locally and at a remote location, can be requested and viewed at a user's multimedia terminal. The system is partitioned into database index managers ("IMs"), extended storage and retrieval units ("extended SRUs"), data sequencing interfaces ("DSIs"), local storage and retrieval units ("local SRUs"), and user terminal modules. Each partition supports features important to the operation and management of the system, but are not necessarily assigned to a specific physical computer or communication component.

In operation, a user first builds a request at a user terminal. The request is transmitted to the user's primary index manager ("PIM") via a local storage and retrieval unit (local SRU). The local SRU attaches a Regional Identifier to the request to assist the PIM to efficiently search for, locate and report on the requested information. The local SRU provides temporary storage for the user's most requested video clips, and before the query is sent to the user's PIM, the local SRU is polled for requested video clips. The user query, amended to contain a Regional identifier and to reflect any local matches, is then forwarded to the PIM.

The PIM uses the Regional Identifier to identify remote IMs which may have the requested video information. The PIM also checks to see whether the video clips stored at the local SRU are current. The PIM then queries its own video clip listing and the listing for the remote IMs to locate the requested information. A list or summary of all available data responsive to the request is then transmitted to the user via the local SRU. The user may then update or modify the request to create an abbreviated list of video clips and/or other data the user wishes to view.

The abbreviated user query is then passed to the PIM. The PIM, having previously located each requested video clip on other remote IMs, retrieves the requested video clips and displays them at the user's terminal by creating a DSI for each user that requests video clips that are not stored at the local SRU, and informing the DSI where the requested video clips are stored. The DSI collects the requested video clips from the appropriate extended and remote SRUs and transmits this information to the local SRUs.

The requested video clips satisfying the user query are then displayed at the user's terminal. The user may display, copy, and/or save or print the results. Copies can also be made on standard video cassettes. In a preferred embodiment, the DSI has the capability of resequencing the transmission order of video clips to further manage the demands on the system. For example, requested video data may be stored and retrieved at various locations throughout the system, at various distances from the user, and accessible through different networks or communications routes, with different bandwidths and transmission speeds. In a preferred embodiment, the DSI determines the most appropriate routes and schedules for downloading requested information, to provide fast and efficient service to the user without unduly taxing the shared components of the system. The PIM records how often particular video clips are requested, and from this information determines whether those clips should be duplicated at particular local SRUs for ready display. As video clips are updated or eliminated, the PIM makes the required updates to the database log. Also, the PIM keeps track of billing information for the users of the system.

The invention is also directed to a video clip storage and retrieval system allowing users to access data from Web or Web-like sites on the Internet or other network.

First, specific Web page audiovisual content is dissociated from its original server, and is distributed to numerous servers in geographically different areas having a relatively short distance (geographically and electronically) to the user's terminal. This is facilitated by embedding a "video ID" in a Web page to indirectly specify a video clip. A database is accessed to relate the video ID to the optimal server from which to download the clip. This is accomplished in such a way as to locate audio/video content on servers close to those users expected to request it, thereby minimizing the number of network nodes traversed. Furthermore, if certain servers are overloaded or out of service, the data is dynamically redundant, so the desired content can be efficiently retrieved from alternate sites.

According to the present invention, data is distributed on the network in a configuration responsive to historical usage, current usage, and predicted usage. By optimizing these considerations, network traffic can be reduced and overloaded servers and communications links avoided. In addition, geographical servers can be established to hold clips of particular interest for a specific geographical region, and subject-matter server& can be established to hold clips pertaining to certain subject areas.

Furthermore, frequently requested clips can be queued and multicast to multiple users at one time. This, too, reduces network traffic and increases responsivity.

Another aspect of the invention is its ability to allow a user to interact with the retrieved video clip. Technology to physically manipulate video information on personal computers is known. For example, video capture boards can receive a video signal from a television or VCR and can store video data for later editing or viewing. Video boards and systems of this kind can employ compression protocols, such as "MPEG" Motion Picture Experts Group) standards 1 and 2, and Motion "JPEG" (Joint Photographic Experts Group) to store and transmit video data in a highly compressed state. This reduces the storage capacity and transmission time needed to work with the video data. Such systems allow a user to view and edit video on a personal computer terminal, but unlike the present invention, do not provide the capability of selecting and retrieving desired video clips from remote locations at high speed.

In a preferred embodiment of the present invention, the user establishes an account with a content provider or ISP. This account may be in the form of a subscription, a debit account, or any of numerous other known payment arrangements. When the user accesses subscribed-to content through the system, the account can be updated. In this manner, the user can be billed for usage in any manner desired, subscription information can be tracked and preserved, authorization levels can be set, and data protection to prevent unauthorized use can be accomplished.

The system may offer secondary audio visual information which would correspond to the requested video clips. In an illustrative application within the real estate industry, the secondary audio visual information could be the schools, shopping centers, and hospitals situated in the vicinity of a requested property. The secondary videos are related to the primary audio-visual data or video clips through a coordinate system to minimize data entry, data storage, and the demands on the system's computational resources.

Certain advanced embodiments also allows the user to perform "what if" alterations of the downloaded information, for example, allowing the user to show a potential buyer what a listed house would look like with a porch addition.

In general, the user's ability to download video clips is enhanced by the present invention. When the user wants to view a clip, the video ID will be retrieved and sent to a regional database. If the regional database can match the video ID to a clip existing on a local server, and the user's subscription rights are sufficient, then the clip will be downloaded from the local server. If the clip is unavailable locally, or the local server is overburdened, then succeedingly more remote servers will be queried for the transfer. Accordingly, the fastest possible path will be selected, and traffic will be minimized on the network.

Exemplary embodiments of this invention are directed to the real estate industry and to video delivery over the Internet. However, as will become readily apparent, the invention is applicable to a wide range of end uses where convenient access to corresponding audio-visual information would be useful. For example, the video clip retrieval system can be used for retail sales, dating services, travel services, and many other applications.

BRIEF DESCRIPTION OF THE DRAWINGS

The features of the invention will be more readily apparent from the following detailed description and drawings of an illustrative embodiment of the invention.

DETAILED DESCRIPTION OF THE INVENTION

Figure 1:
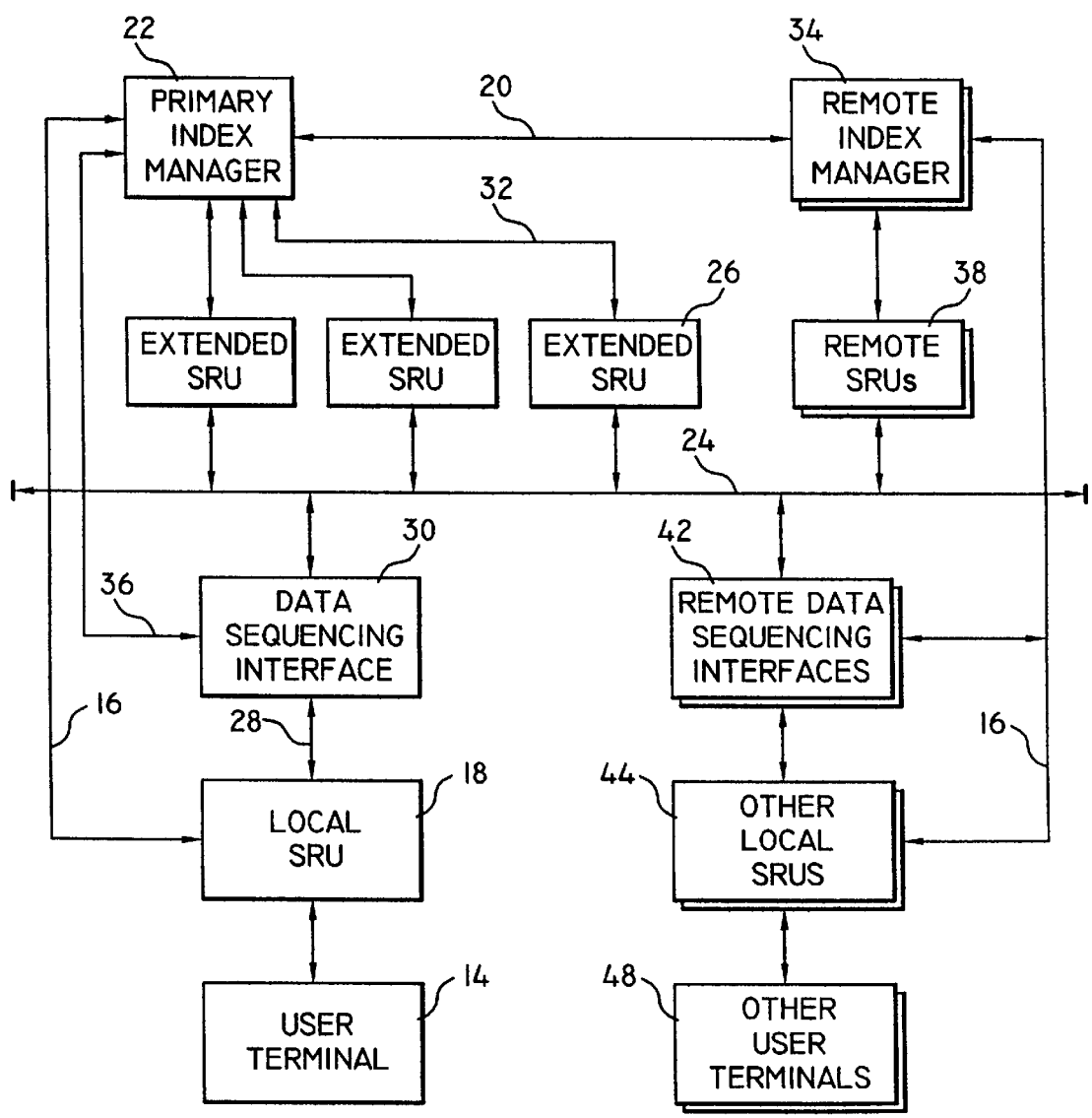
FIG. 1 is a block diagram showing a preferred hierarchy of the system.

FIG. 1 illustrates a preferred embodiment of the video clip storage and retrieval system, showing its structural hierarchy and the various modules which comprise the system. As shown, the system comprises one or more user terminals 14, a local storage and retrieval unit ("local SRU") 18, a data sequencing interface (DSI) 30, one or more extended storage and retrieval units ("extended SRUs") 26, and one or more index managers ("IM") 22.

By way of a system overview, video clips are stored primarily on extended SRUs 26, and are tracked and distributed by the IMs 22. A user obtains videos of interest by communicating with a primary index manager ("PIM") 22 via a local SRU 18. The PIM 22 locates the requested video clips and creates a DSI 30 to direct the efficient download of the video clips to the user terminal 14. The connections between terminal 14 and the local SRU 18 can be within the same computer, or between two or more computers located within a building, which are linked together on a local area network.

Exemplary software modules comprising each component of the system, and databases associated with each software module, are depicted in Table 1, below. Preferred and non-limiting embodiments of each module of the system are also described below, with reference to FIG. 1 and Table 1.

TABLE 1

SOFTWARE MODULES & DATABASE PARTITIONING

| SOFTWARE MODULES | DATABASE PARTITIONS |
|---|---|
| USER TERMINAL | |
| Search and Query Interface | |
| Audio-Visual Display Interface | |
| Data Decompression Logic | |
| INDEX MANAGER | INDEX MANAGER |
| IM Supervisory Process | Text Database |
| Text Database Management Logic | IM List |
| Storage Management Logic | SRU List |
| Message Routing Logic | Audio-Visual Data Index |
| DSI & SRU Command Logic | Audio-Visual Access List |
| DATA SEQUENCING INTERFACE | |
| DSI Process | |
| Audio-Visual Sequencing Logic | |
| Index Manager Interface | |
| Extended SRU Interface | |
| Local SRU Interface | |
| EXTENDED SRU | EXTENDED SRU |
| SRU Process | Active A/V Listings |
| IM Command Interface | Inactive A/V Listings |
| DSI Command Interface | Secondary A/V Listings |
| | Remote A/V Listings |
| LOCAL SRU | LOCAL SRU |
| Search and Update Logic | Local A/V Data Index |
| Regional Identifier Builder | Actual A/V Data |
| Audio-Visual Download Interface | |
| Compression/Decompression | |

User Terminal

A user terminal 14 is the user's interface to the system, and typically is a personal computer, workstation, or a television set top box. Terminal 14 is connected to or includes the local SRU 18, and sends the user's requests to the PIM 22, after initial interrogation of local SRU 18. As shown in FIG. 1, terminal 14 communicates with a PIM 22 to obtain requested audio-visual data, wherever the requested data is stored, e.g. on extended SRUs 26 or remote SRUs 38, and on different systems or networks at different communication and/or phone system addresses. Terminal 14 receives or downloads requested audio-visual information through the local SRU 18.

As shown in Table 1, each user terminal 14 comprises a search and query interface, an audio-visual display interface, and audio-visual data decompression logic. The search and query interface provides the user access to a database or index which can be interrogated for desired video clips and other information. For example, in a real estate application, one such database could be the Multiple Listing Service (MLS).

The audio-visual display interface provides a mechanism for the user to manipulate retrieved video clips. After requested video clips have been displayed on the user's terminal 14, the user may then interact with the system using, for example, a play, stop, pause, fast forward, fast reverse, forward and reverse metaphor. The user may elect to "jump" to specified locations within the clip, the locations being tabulated in a window on the user's terminal 14. Also, displayed in another window on the user's screen may be a list of available secondary options for user interaction.

In a preferred embodiment, videos are stored and moved through the system in a highly compressed state and will be decompressed at the users terminal 14. The decompression logic utilized may be commercially available video decompression standards and protocols, for example, Motion Picture Experts Group ("MPEG") standards 1 and 2, MJPEG, Indeo, or Fractal.

Local Search and Retrieval Unit (Local SRU)

The local SRU 18 is the temporary storage location for video clips and for information downloaded from the extended and/or remote SRUs 26 and 38, for use at user terminal 14. As shown in FIG. 1, user terminal 14 and local SRU 18 may be combined as one computing system. In a preferred embodiment, the local SRU 18 is connected to one or more user terminals 14, each local SRU 18 being capable of supporting a large number of user terminals 14. For example, the local SRU 18 may comprise a file server for a local area network, with one or more integral or connected storage devices. In such an embodiment, each terminal 14 interacts with the local SRU 18 via a network connection, e.g. as a network node, using conventional network protocols and topologies.

Suitable storage media for use in a local SRU 18 include large capacity hard drives, such as 1, 2 or 5 gigabyte hard drives, high speed optical drives, RAID devices, and other media capable of storing locally a reasonable complement of video clips for ready access and manipulation. Portions of the local SRU's 18 disk storage capacity are designated as the storage capacity required to duplicate a subset of the primary and remote IM(s) audio-video data index databases. This information is used during terminal queries to determine which video clips are stored locally. Video segment revision information is also maintained within the index database, and is returned to the IM during the query process in order to maintain video segment accuracy. In the event that additional storage space is required, additional disk storage may be provided to the local SRU, to include storage capacity for active, inactive, and secondary audiovisual listings.

Apart from storing audio-visual data, the local SRU 18 comprises local search and update logic, a regional identifier builder, an audio-visual data download interface, and (6) compression/decompression logic (Table 1).

The Regional Identifier Builder component of local SRU 18 attaches a regional code or identifier to each user request. The regional identifier allows the PIM 22 to communicate with specified remote IMs 34, and to determine the locations of requested video clips stored at remote SRUs 38. In an embodiment used to distribute real estate data, the regional identifier may be the ZIP code of the property in the video segment. This information may be taken directly from the text database. It will be apparent, however, that the (Regional ID) field can be keyed to any convenient category or context-sensitive description suitable for the type of information stored and the desired end use.

Local SRU 18 transmits downloaded video clips to the user terminal 14 in a highly compressed state. In a preferred embodiment of the invention, this operation is mediated by an Audio-visual Download Interface associated with local SRU 18 (Table 1), with decompression prior to and/or in "real-time" during viewing occurring at the user terminal 14. Local SRU 18, via its download interface, also communicates with a DSI 30, described in more detail below. DSI 30 manages the download of video clips and other information to local SRU 18 from the various locations where responsive information is found.

The local search and update logic serves primarily two functions. First, it enables local SRU 18 to search its storage media for requested video clips before the query is transmitted to the PIM 22. The update logic allows the PIM 22 to identify whether the locally available video clip is current. Thus, when the user's request is transmitted to the PIM 22, the request is modified to indicate (1) whether the video segment is stored locally, and (2) the current Revision Code associated with the video clip. If the PIM 22 locates a clip that supersedes the one currently stored on the local SRU 18, the local SRU 18 is notified, the old data is deleted, and the new data is downloaded from the SRU 26 containing the updated video clip.

A second function of the local search and update logic is to identify and track the most frequently requested audio-visual clips. These video clips are identified for continued storage within the local SRU 18. This ensures that once a predetermined local SRU storage capacity is reached, only the most heavily used video clips are stored at the local SRU 18. In one embodiment of the invention, when a video clip with higher usage than the least used locally stored clip is identified, the least used clip is replaced by the higher usage clip within local SRU 18. In another embodiment, local SRU 18 may store the last requested video clips, space permitting. A combination of these and other storage swapping and management approaches may be used.

In a preferred embodiment, DSI 30 transmits information in compressed form to local SRUs 18 for downloading to the user's terminal 14. The decompression is performed at the user terminal 14 using conventional decompression standards. However, where the user is using a television screen, or other unintelligent device, to receive the audiovisual data, the decompression, via commercially available decompression standards (discussed above) will take place at the local SRU 18.

Primary Index Manager

The PIM 22 is the primary search engine and database management module of the invention. As shown in Table 1, PIM 22 comprises (a) index manager supervisory process; (b) text database management logic; (c) storage management logic; (d) message routing logic; and (e) DSI & extended SRU command logic. The PIM 22 is designed so that no two functions must specifically reside on the same physical computer, although it will be apparent that in preferred embodiments certain functions may be conveniently or efficiently grouped together conceptually and/or physically, for greater ease of use.

The "index manager supervisory process" (Table 1) is the software interface to the high speed communication interface (explained below). It provides the communication interface to the local SRUs 18 and to the text databases. When the user's query necessitates creating a DSI 30, the "index manager supervisory process" creates a DSI 30 on its computer system unless the "index manager supervisory process" determines that the current state of high speed communications on its computer exceeds a predetermined limit, for example, 40–80 users. In that event, the DSI 30 is created on a different computer system.

The "text database management logic" is incorporated from the text database in use with the system, and manages and controls text data stored within these databases. For example, in the real estate embodiment, the "text database management logic" is the logic associated with the Multiple Listing Service ("MLS") database, and is structured to allow MLS queries spanning the entire distributed network.

The "storage management logic" is the system "storage engine" and is responsible for placing new and/or updated or uploaded audio-visual data on the most appropriate extended SRU 26. Audio-visual segments or clips can be stored to more than one extended SRU 26, when duplication would minimize traffic to and from local SRUs 18, for example over high speed network 24 or communication line 16. The decision to move or copy data to an extended SRU 26 from a remote IM 34 and SRU 28, or from another extended SRU 26, is made for example by evaluating an algorithm which accounts for available storage space on the various SRUs 26, the demand for particular video clips, and the locations of users requesting the most popular videos. The "storage management logic" may also track parameters such as the cost of transmitting and storing duplicate information, and helps to ensure that each extended SRU 26 is utilized efficiently, and that no extended SRU 26 becomes "overextended."

The index manager "message routing logic" accepts regionalized queries from the local SRU 18, deciphers the queries, and subsequently forwards the disassembled queries to remote IMs 34. The index manager "message routing logic" also accepts the responses received from the remote IMs 34, formulates a comprehensive response, and relays this response to the user.

The "DSI and SRU command logic" provides the IM 22 with the capability of directly communicating and controlling the DSIs 30 and the SRUs 26. The PIM 22 uses this interface to pass the data required to enable the DSI 30 to communicate with the extended and remote SRUs 26 and 38 to direct these SRUs to download video information.

The "SRU Command logic" sees to the duplication of popular videos on alternate SRUs 26. It also places copies of video segments on SRUs geographically closer to the users most interested in those videos. The goal is not duplicate data onto SRUs 26 where the number of frequently downloaded videos ("FDVs") is already high (above a predetermined value). Duplication of data is performed according to the following logic during non-peak periods of system operation. The PIM 22 determines whether it is managing an extended SRU 26 which has an FDV level above this predetermined value. This determination is made by searching through the "Audio-Visual Data Index" database (described below) to identify the video clips that have been accessed most frequently. From this video subset, videos are selected for transferal or duplication based on where the video was used most. If the FDV was transferred principally from DSIs 30 created by the PIM 22, extended SRUs 26 located within the same computer are evaluated to determine whether that extended SRU 26 can accept a duplicate copy of the video clip. If so, the FDV is duplicated on the identified extended SRU 26.

Extended Storage and Retrieval Unit (Extended SRU)

As noted above, extended SRU 26 is the principle storage facility for the system and is used to store audio-visual data in a plurality of audio-visual storage media. Although this section refers primarily to the extended SRU 26, the term includes remote SRUs 38 which may also store requested audio-visual information. The software modules are identical.

The most requested audiovisual data, to include the FDVs, are written in contiguous allocation blocks closest to the system's disk storage allocation table. Inactive video segments are stored in contiguous allocation blocks furthest away from the "disk storage allocation table." In an alternative configuration, the disk storage allocation table is maintained in RAM or on a separate computer. Disk storage is organized in macro storage cells which insure that each video segment will always be stored in contiguous allocation blocks. This may be achieved, for example, by using a storage cell capable of storing a two minute audiovisual segment.

Referring to FIG. 1, one or more extended SRUs 26 are connected to the PIM 22 and to each terminal-unique DSI 30, in the event that the PIM 22 determines that a DSI 30 should be created. The extended SRUs 26, upon direction of a DSI 30, transmit requested data, via the DSI 30, to an appropriate local SRU 18, and ultimately to user terminal 14.

The extended SRU 26 comprises an SRU supervisory process, an IM command interface, and a DSI command interface. The SRU supervisory process enables the extended SRU 26 to communicate directly with the IMs 22 and DSIs 30. This interface responds to messages and data packets addressed to it. It also encapsulates, for network transmission purposes, video data to be transmitted to other SRUs 26 or DSIs 30. The SRU supervisory process allows the SRU 26 to store data transferred to it. Similarly, the SRU supervisory process can delete all out of date or unnecessarily duplicated data. This storage and deletion of data are performed under the direction of the PIM 22 via the "IM Command Interface."

The "DSI command interfaces" exist to allow the PIM 22 to function apart from the extended SRUs 26. The DSI command interface is provided to direct the extended SRU 26 to download the audio-visual information to the DSI 30 transmit buffers for eventual download to the user terminal 14.

Data Sequencing Interface (DSI)

According to the invention, each DSI 30 is created by the PIM 22 to facilitate data transfer from the extended and remote SRUs 26 and 38 to the user terminal 14. When created, the DSI 30 may reside within the extended or local components of the system, but in the preferred embodiment of FIG. 1 is shown locally. The DSI 30 collects, manages, and buffers data which is transmitted from both extended SRUs 26 and remote SRUs 38 to the local SRU 18, and then downloaded to the user's terminal 14.

A DSI 30 is created and/or initialized by PIM 22 whenever a user requests audiovisual information that is not stored within the local SRU. In a preferred embodiment, the DSI 30 is created just prior to the video data download process, and destroyed immediately thereafter. This allows the system to use one communication network for querying and another, preferably higher bandwidth, communication network for video data downloads. For example, the D channel ("X.25 packet" network) of an "integrated services digital network" ("ISDN") connection may carry the video querying traffic of the video network, to include forwarding the user query to the PIM 22, and receiving the response from the PIM 22. Once the user has finally determined which video clips are to be retrieved, the PIM 22 identifies the most appropriate and efficient location for the DSI 30 and then creates the DSI 30 at this location. A detailed "DSI Video Download List" is then passed to the DSI 30 by the PIM 22. The DSI 30 uses this list to direct the SRUs to download the requested information.

Also, the DSI 30 allows the network to connect many geographically distributed video data sources to one subscriber destination.

DSI 30 comprises (1) a DSI supervisory process, (2) audio-visual sequencing logic, (3) a PIM interface, (4) an extended SRU interface, and (5) a local SRU interface.

The DSI supervisory process enables the DSI 30 to communicate directly with the PIM 22, the extended and remote SRUs 26 and 38, and the local SRUs 18.

Figure 2:
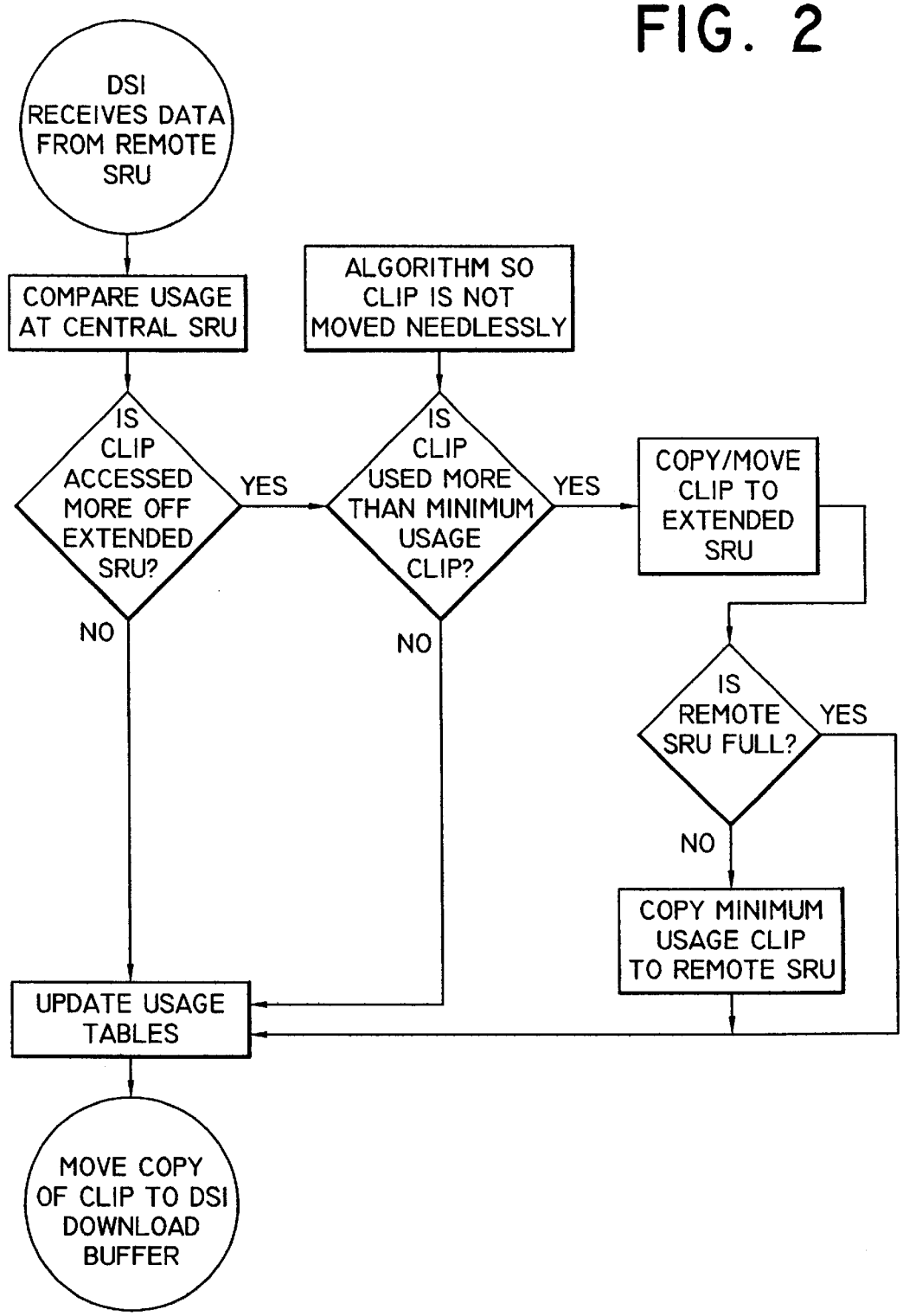
FIG. 2 is a block diagram illustrating how various modules of the video clip retrieval system may be addressed.

The "audio-visual sequencing logic" for DSI 30 operates broadly as shown in FIG. 2. The "audio-visual sequencing logic" enables DSI 30 to resequence data, to provide for more efficient use of the storage and retrieval units. The object is to allow the system to utilize idle resources throughout the network. The DSI 30 actively determines which computing systems and communication paths to the user should be used for each download. Thus, if a particular extended SRU 26 is busy supporting other users, the PIM 22 may create a remote DSI 42 on a remote system for user terminal 14. Remote DSI 42 would then communicate with user terminal 14, assume responsibility for the download process, and direct the video data download to user terminal 14.

The "index manager interface" provides (1) the command interface between the PIM 22 and the DSI 30, and (2) the feedback mechanism between the DSI 30 and the PIM 22. In the first instance, the PIM 22 uses the "index manager interface" to communicate instructions to the DSI 30 in order for the DSI 30 to collect the requested video information. In the second instance, the DSI 30 reports back to the PIM 22, informing the PIM 22 of the status of each queried extended SRU 26.

The "extended SRU interface" allows the DSI 30 to direct the identified extended SRUs 26 to download requested information to DSI 30 transmit buffers, for download to the user terminal 14. This interface is typically a very high speed interface, for example, FDDI or "FireWire."

The DSI 30, uses the local SRU interface to coordinate its video segment download with the local SRUs 18. The communication interface between the DSI 30 and the local SRU 18 is typically a high speed interface, for example, ISDN. Also, when the traffic around the PIM 22 is high, the DSI command logic establishes, via the local SRU interface, a remote connection with a local SRU 18 (discussed above).

Database Structures

The system may employ relational or flat-file databases, text indexes and/or search engines, and raw data in the form of audio-visual clips and/or text information. Field-oriented databases may be used in the system, and in representing such databases each field can be shown enclosed by parentheses. For example, (Field 1), (Field 2) represents a database with data fields 1 and 2. If the database is related to another database, the relating field can be denoted with square brackets ([ ]). Thus, in the following example, Database 2 is related to Database 1 through field 3.

Database 1: (Field 1), (Field 2), [Field 3]
Database 2: [Field 3], (Field 4), (Field 5)

In the present invention, the PIM 22 software is designed to contain the following database structures: (1) a Text database; (2) an IM list; (3) an SRU list; (4) an Audio-visual data index; and (5) an Audio-visual Access list.

In an illustrative embodiment of the invention, the user, via the PIM 22, has access to at least one "text database" containing records with searchable fields, one of which is [Video ID]. Each record in this database corresponds to a video clip stored on the extended or remote SRU 26 or 38. This database may be maintained by the system or by one or more third party databases, for example, the Multiple Listing Service (MLS) database, and using any suitable data management "front-end."

The "IM list" (Table 1) is a hierarchical database storing information needed to target specific databases during data queries, and serves to identify remote IMs 34 containing requested audio-visual data. The "IM list" is structured as follows:

(IM Address), [Regional ID], (Alternate Address).

Because regional data may span multiple remote IMs 34, there may be multiple remote IM entries in the PIM list database. The (IM Address) helps locate the appropriate remote IM 34 within the network. The [Regional ID] allows the PIM 22 to communicate with remote IMs 34 identified as containing information relating to the requested regional identifier. This reduces the number of servers contacted, thereby reducing messaging that occurs over the high speed network 20. The regional ID is obtained during construction of the query by the local SRU 18 software modules. In certain embodiments of the invention, (Alternate Address) field is a system phone number, electronic address, or other path to the remote IM 34 in the event that other third-party database providers are used.

The "SRU list" is structured as follows:

(SRU Address), (SRU Under-run Count Rate), (SRU Access Count Rate).

The (SRU Under-run Count Rate) is used to track the number of times during a predetermined period, for example, a 24 hour period, that the extended SRU 26 or remote SRU 38 were not able to fulfill data requests because the SRUs were busy downloading data to fulfill other data requests. The (SRU Under-run Count Rate) will be explained below in the SRU monitoring discussion. The (SRU Access Count Rate) monitors how often during a predetermined time interval, a particular SRU is used for video delivery.

The "audio-visual data index" identifies each video clip and specifies its location. The "audio-visual data index" is structured as follows:

[Video ID], (SRU Address), (Location Code), (Revision Code),
(Initial Copy Flag), (Usage Count Rate),
[Secondary Array ID]

As above, the [Video ID] is a unique reference identifier for each video clip and corresponds to an identifying field within the text database. The (SRU Address) identifies the network location of the SRU containing the requested audio-visual information. The (Location Code) is the exact physical location of the video clip within the SRU. The (Revision Code) indicates whether this version of the video clip is the current version. The (Initial Copy Flag) is a field that is appended to each new video clip entry, so that the system knows that this version may only be updated, duplicated, or removed to more remote storage locations, but not deleted from the database entirely. The (Usage Count Rate) keeps track of how often a particular video clip is requested during a predetermined time interval, for example, a 24 hour period. This information is used to determine FDV status. The [Secondary Array ID] is used to point to a "related" database of secondary or related video or text information (not shown).

Thus, in an embodiment where secondary information is provided, such as the real estate embodiment, the user may enhance the available text and audio-visual data by providing additional information about the requested data. For example, in a preferred embodiment directed towards the real estate application, the secondary database may contain audio-visual information about hospitals, schools, and traffic patterns, etc. associated with any requested property video.

In the real estate example, the secondary database may be organized as follows:

[Secondary Array ID], (Segment Coordinate)

The [Secondary Array ID] provides a way for the PIM 22 to flag were additional secondary data is available. The (Segment Coordinate) indicates the geographic area corresponding to the secondary information. The boundaries of this geographic area may be represented by latitude and longitude coordinates either taken from a map or, preferably, taken by GPS. Because the geographic area would typically encompass multiple property listings, each entry in the secondary database would correspond to several video clip entries.

The "audio-visual access list" is comprised of the following fields:

[Video ID], (IM Address), (Access Rate)

This database maintains a list of DSI 30 supporting "computer systems," by virtue of the managing or nearest IM address to which audio-visual information was delivered. The DSI 30 requests data from many SRUs. When a DSI has successfully collected data from a particular SRU, its managing IM's "audio-visual access list" database is updated to reflect that video segment delivery to that physical location within the network. The network now has information representing the destinations of specific video segments from specific SRUs. This information is used to determine the most meaningful destination for videos and/or copies of videos distributed by the network storage management logic.

Apart from providing the primary storage location for the video clips, the extended SRU 26 comprises an "active A/V listing," and "inactive A/V listing," a "secondary A/V listing," and a "remote A/V listing." The purpose for each of these listings will be explained in relation to a real estate application. In the real estate context, new property listings are typically of greater interest to the user and, therefore, would comprise the "active A/V listing." Older property listings would not be selected as frequently and would comprise the "inactive A/V listing." However, a change in the property status, for example, reducing the price of the property may return the property to the "active A/V listing." The "secondary A/V listing" would comprise the secondary information associated with certain video clips. The "remote A/V listing" would typically comprise property that has already been sold. This information would still be useful for comparative pricing purposes, but would be accessed relatively infrequently.

The audio-visual data stored on the extended SRU 26 is the video clip itself. In a preferred embodiment of the invention, video data is stored on the extended SRU 26 in storage blocks equivalent to approximately two (2) minutes of audio-visual data. The actual length of these storage blocks varies and is dependent upon the video delivery application. Audio data is also stored on the SRU in blocks of similar length. The entire audio and video segment may be stored contiguously, with the video and audio data being stored either separately or together.

The local SRU contains a "local audio-visual index" and "actual audio-visual data." Audio-visual data stored on the local SRU 18 is organized in the same manner as the data stored on the extended SRU 26. The "local audio-visual index" comprises the following data fields:

[Video ID], (Location Code), (Revision Code)

The [Video ID] corresponds to a field in the text database, and identifies the video clip. The (Location Code) specifies the exact storage location of the video clip within the local SRU 18. The (Revision Code) indicates whether the stored version of the video clip is current.

When the DSI 30 is created, the PIM 22 transmits a data structure that identifies the requested video clips, and the exact locations of each video clip. The data structure is as follows:

[Video ID], (IM Address), (SRU Address), (Location Code), (SRU Access Count Rate), (SRU Under-run Count Rate)

The [Video ID], (IM Address), (SRU Address), (SRU Access Count Rate), and (SRU Under-run Count Rate) serve the same functions as previously described. The [Video ID] field is the principle field, with the remaining fields being supporting fields to the [Video ID] field. The (Location Code) is the precise video storage address within the SRU. Since it is possible for each video segment corresponding to a unique [Video ID] to have multiple unique storage locations, the DSI 30 may have multiple records for separate storage locations for that video segment within the DSI's 30 video data download structure. Thus, if one SRU cannot respond to the DSIs command because it is busy downloading audio-visual information to fulfill another request, then the DSI 30 simply retrieves the requested video clip from another location.

Storing a Video Clip

When a new video clip is received, the PIM 22 must first determine which extended or remote SRU 26 or 38 will store the audio-visual information. The PIM 22 identifies the IMs 34 supporting that video segment's region by comparing the regional identifiers. The PIM 22 then checks to see whether these SRUs have available FDV storage. This is because most new video clip listings will fall into the FDV category. If sufficient FDV storage is found, the video clip is stored on that SRU (26 or 38), and the supervising IM's (22 or 34) A/V Data Index database is updated. However, if no suitable storage is found, the PIM 22 will determine the SRU with the lowest FDV allocation and store the video to that SRU.

A video clip is stored as follows: (1) A video is transmitted to an SRU 26 for storage; (2) the "SRU supervisory process" writes the information to the disk and returns the storage location of the data to the PIM 22 (the format of the storage location message is dependent on the type of file: UNIX, DOS, etc); and (3) the PIM 22 writes the video clip's storage address into "A/V data index" database on the PIM 22.

Retrieving a Video Clip

Figure 3:
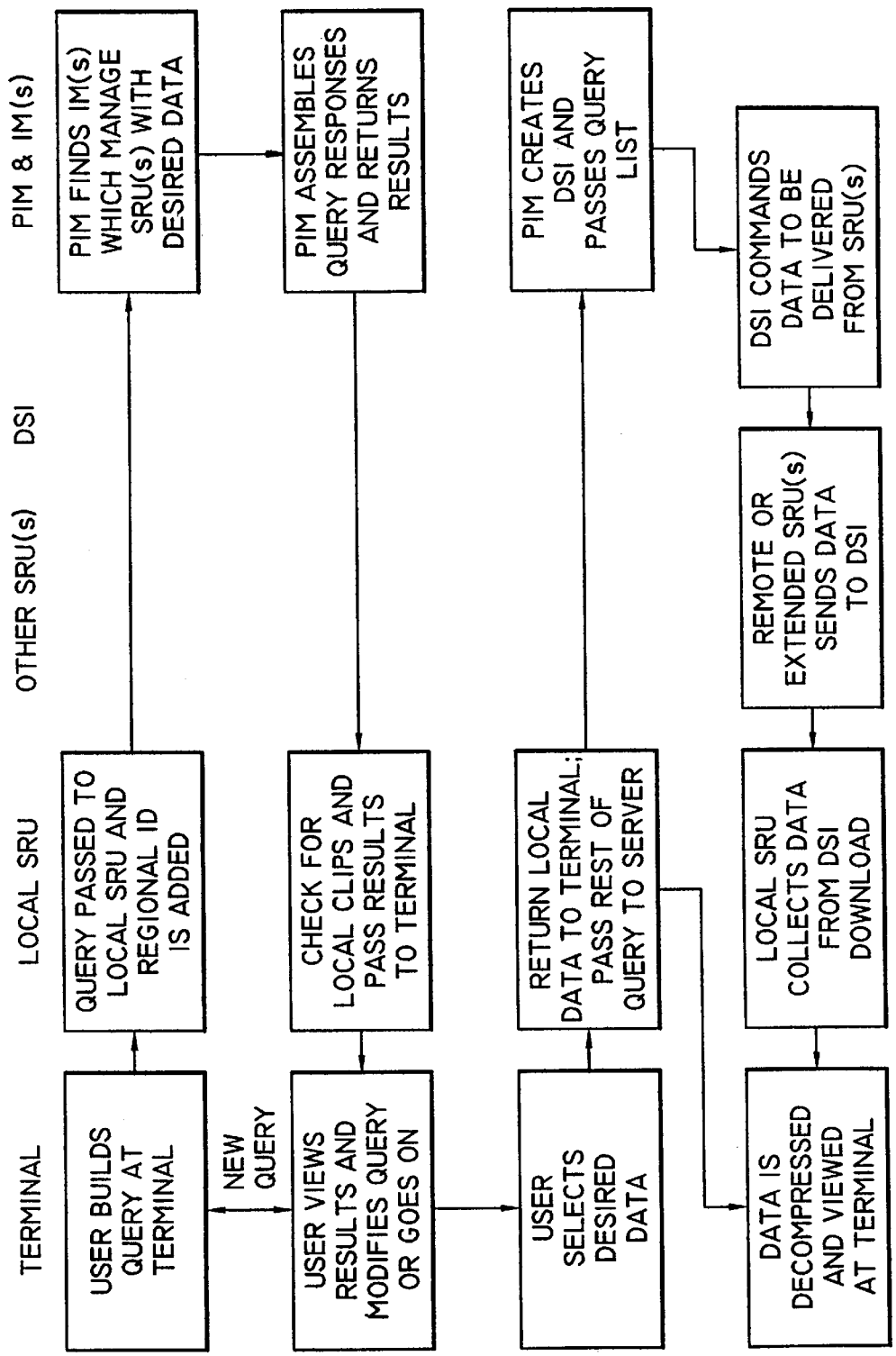
FIG. 3 is a flow chart illustrating data sequencing interface logic for video clip storage management.

FIG. 3 provides a summary of how a preferred embodiment of the invention would operate to search and download data. The user first builds a data query at the user terminal 14 from the text database. For example, in the real estate application, the user would specify a selected property criteria from the MLS. Once constructed, the query is transmitted to the PIM 22 via a local SRU 18. The local SRU 18 modifies the query in the following ways: (1) attaches a regional identifier to the query; and (2) searches its own database and flags each request that is stored at the local SRU 18 by appending a Revision Code to the request. The audio-visual data index also specifies the exact locations of the audio-visual data stored at the extended SRUs 26 and, via the remote IMs 34, the locations of video data stored that the remote SRUs 38. The PIM 22 uses the regional identifier to identify which remote IMs 34 contain the requested video segments. Each identified remote IM 34 processes the query, returning a list or summary of available audio-visual references to the PIM 22. The PIM 22 also uses the Revision Code to determine whether the video segment stored at the local SRU 18 is the most current copy available. The PIM 22 subsequently downloads a list of all available video clips to the user's terminal 14, indicating which video clips are immediately available by virtue of the fact that a current copy of the video segment is stored at the local SRU 18.

Using the list of matching database records and audio-visual references, the user identifies and selects individual records or groups of records for further viewing and manipulation. This abbreviated list is transmitted to the PIM 22. The PIM 22 creates a DSI 30 and communicates the exact storage location of each requested video clip to the DSI. The DSI 30, in sequential fashion, queries each extended SRU 26 and remote SRU 38 (if applicable) communicating the exact video clip location to the SRU. The DSI 30 may have multiple address locations for each requested video clip, some locations being on the extended SRUs 26 and other locations being on remote SRUs 38. The DSI 30 will first attempt to collect the video clips from the extended SRUs 26 before attempting to retrieve similar information from the remote SRUs 38. The affected SRUs downloads the requested data to the transmit buffers of the DSI 30, where a predetermined number of video clips may be stored in RAM until the local SRU 18 is ready to receive the information. The DSI 30 updates the SRU access counter and transmits this information to the PIM 22 for use in monitoring demands on the SRUs. Once the data has been received by the local SRU 18, the local SRU 18 downloads the video clips to the user terminal 14.

In the event that the queried SRU is presently busy delivering data, the DSI 30 may either use the alternate video address to attempt to retrieve the requested video clip from another SRU, or else moves on to retrieve the next requested video segment. Whenever an SRU fails to deliver the requested video clip, the DSI 30 increments the SRU under-run counter for that SRU and eventually communicates this information to the PIM 22. If the SRU under-run count exceeds a predetermined threshold value (communicated to the DSI 30 upon creation), the PIM 22 directs further requests away from this affected SRU by having the DSI 30 query alternate SRUs for the video clip information. In the event that the video clip is only stored at this location, then a delay will be encountered as the DSI 30 waits for the video information to be downloaded. The PIM 22 will also direct that the number of FDVs be decremented for this affected extended SRU 26.

In addition, since the SRU under-run count parameter identifies the location of "over-accessed" SRUs, audio-visual data will be moved or copied from these heavily loaded SRUs to more lightly loaded SRUs (based on their under-run levels), in an effort to distribute or flatten SRU demand. This load management process will occur during off-peak hours. The SRUs selected for copies or transferal of data will be identified from video usage information obtained from the "Audio-Visual Access List" located on the PIM 22.

Data is preferably (1) maintained on the extended SRUs 26 which are most often queried for that data, (2) duplicated on local SRUs 18 which most often request the data, or (3) may be duplicated on other remote SRUs 38 as space allows. This supply and demand approach, mediated by PIM 22 in response to DSI monitoring inputs, provides fast access to the most requested information and efficient storage with maximum of useful redundancy without waste or loss of performance. Alternatively, the network may also be configured to always store each audio-visual entry in at least one other location (space providing). This redundancy introduces improved throughput and offers improved reliability.

Communication Interfaces

In a preferred embodiment, as shown in FIG. 1, the system provides a plurality of extended SRUs, each of which communicates with the Primary Index Manager (PIM) 22 and the Data Sequencing Interface (DSI) 30. This provides a flexible, high capacity, high throughput system which can be readily expanded as needed, and can provide for efficient distribution and backup of video clips and other data on the system. Also as illustrated in FIG. 1, the video clip system may communicate with other systems, for accessing video clips or other data stored at remote locations.

Communication between the PIM 22 and the remote index managers (IMs) 34 is primarily concerned with queries and results of queries, and is facilitated in a preferred embodiment by a very high speed network 20, for example, the Fiber Distributed Data Interface ("FDDI") which approaches speeds of 100 megabits per second. The PIM 22 communicates with the extended SRUs 26 via a similar very high speed network 32 where the extended SRUs 26 are located on the same computer as the PIM 22. Alternatively, other networks may be used, for example a very high speed AIM network in embodiments where the extended SRUs 26 are distributed in a wide area network (WAN) configuration. The PIM 22 further communicates with the local SRU 18 via a high speed network 16, such as ISDN. Whenever a DSI 30 is created, PIM 22 communicates with the DSI 30 via network 36, and like PIM 22 communication with extended SRUs 26, is via a very high speed interface (for example, FDDI, FireWire, or ATM).

Communications between the extended or remote SRUs 26 or 38 and the DSI 30 are via a very high speed interface 24, for example, FDDI. This communication interface supports the throughput of vast amounts of audio-visual data. In contrast, the communication interface 28 between the DSI 30 and the local SRU 18 is less demanding, and may be via a high speed (ISDN) interface. It is preferable that the communication interface 28 between the DSI 30 and the local SRU 18 be at least 56 KBAUD to support the "real time" video requirements of approximately 15 f.p.s. Typically, the local SRU 18 and the user terminal 14 are located in the same computer providing for a very high speed communications interface.

The remote IMs 34 are linked to their own extended SRUs, shown as remote SRUs 38 in FIG. 1. Remote SRUs 38 communicate with remote DSIs 42, other local SRUs 44, and other user terminals 48 according to the same flexible hierarchy as the extended and local design described above.

EXAMPLES

Representative non-limiting examples of the invention follow, and illustrate how the invention can advantageously be used. It will be readily apparent that, in addition to these examples numerous other applications of the video clip retrieval system are possible and are within the scope of the invention.

Example 1—Real Estate

In an embodiment of the invention for use with real estate data, the user would use a property database like the Multiple Listing Service as the primary text database, to determine the properties the user wishes to investigate. The user formulates an initial search query which is transmitted to the local SRU 18. The local SRU attaches the Regional ID to the query, which, in this application, may be the ZIP code(s), map, Cartesian, or GPS coordinate(s) associated with the requested properties. The local SRU 18 also searches its own storage facilities to determine whether the requested video clips are stored locally and, if so, attaches a Revision Code to available video clips. This enhanced query is transmitted to the PIM 22. The PIM 22 (1) updates the video clip usage tables; (2) uses the Regional ID to efficiently determine from among many remote IMs 34, which remote IM 34 has any information relevant to the enhanced query; and (3) uses the Revision Code to determine whether the locally available video clip is up-to-date. A list of available video clips is transmitted to the user. The user may then choose the video clips the user desires to view. This request is retransmitted to the PIM 22 via the local SRU 18. The PIM 22 creates a DSI 30, indicating to the DSI 30 where the requested video clips reside. The DSI 30 directs the extended SRUs 26 to download the video clips into the DSI 30 transmit buffers. The video clips are transmitted to the local SRU 18, and are subsequently displayed at the user terminal 14.

In this illustrative application, any available secondary video may be cataloged according to the geographical region it supports. A list of secondary videos may be displayed in a "Secondary Video" window on the subscriber's terminal whenever the property video is viewed. When the user requests the secondary video, this request is transmitted to the PIM 22. The PIM 22 has already determined the location of the secondary video information. The PIM 22 either uses the previously created DSI 30 or it creates another DSI 30 and passes the location of the secondary videos to the DSI 30. The DSI 30 then directs the SRUs containing the secondary video information to download this information.

In a further embodiment of the invention, the property's coordinates are obtained from previously established map data. In another embodiment, the longitude and latitude of each property is obtained using a Global Positioning System (GPS) system, for example when the property is being filmed, and may be recorded along with the property's corresponding text data.

Example 2—Prescription Drug Information

Another application of the invention is directed towards providing online drug prescription information to physicians. Traditionally, pharmaceutical companies have utilized very expensive detail forces to physically meet with physicians to educate them about proprietary medications. However, recently, with the tremendous downward pressure on prescription pricing, the rapidly rising costs of drug discovery and development, the speed of reverse engineering by competitors and the more liberal generic drug approval policy, drug companies can no longer afford a full detail force to market their proprietary drugs. At present, high quality video cassettes are produced about the drug, and are sent directly to the physician in an attempt to supplement the sales force.

One embodiment of the invention provides ready access to audio-visual information about various drugs available to the physician. As with the real estate application, a third party text database may be used, for example, an on-line version of the "Physicians Desk Reference." The physician may simply search through the on-line database and select a list of drugs that the physician would like to view on video. The system will search for, locate, and download the requested audio-visual information. The drug videos may serve a variety of functions. For example, the physician may use this audio-visual information to learn about new drugs, or simply to refresh or update their knowledge about existing drugs. Also, drug companies may place advertisements about promotional drugs on the video clips for use by the physician.

Example 3—Retail Services

Another application of the invention is directed towards the retail industry, for example, the sale, lease and/or rental of new and used automobiles. The text database could include a listing of automobiles, price data, performance data, etc. The video clip retrieval system would retrieve pertinent video clips, thereby enhancing the available text database. Another application in the retail arena would be to provide multi-media information on businesses or services such as those listed in the "yellow pages."

Example 4—Personnel

A further application could be directed to the personnel industry, where video presentations could be used to enhance available text information profiles on specified employees. Such information may encompass providing information to healthcare providers about existing and prospective patients. The system may also be used to provide information about the healthcare providers to patients. These videos clips would help the patients/consumer make a selection, by providing a way to screen the physicians by providing background information on education and areas of expertise, as well as providing a video depiction of the hospital or clinic.

Example 5—Dating Services

The dating service industry is yet another area where the video clip retrieval system could be utilized. Video clips of potential "dates" could be shown by the dating service to assist customers in obtaining suitable partners.

Example 6—Travel Services

Yet another application of the system is in the travel business where travel agents can access video clips of holiday locations for customers to view.

Example 7—Internet Example

Figure 4:
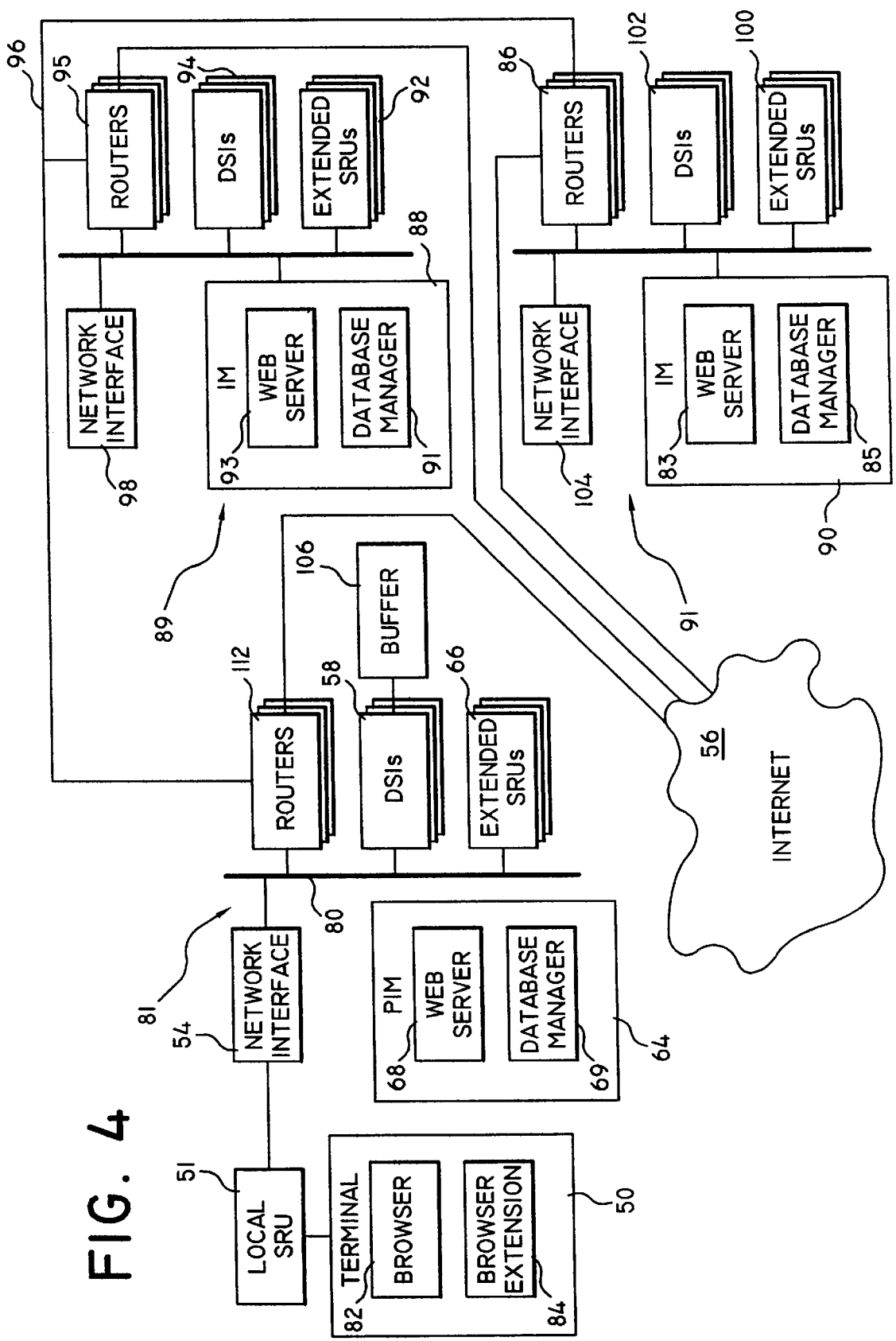
FIG. 4 is a block diagram of an embodiment of the present invention implementing video clip delivery over the Internet.

FIG. 4 is a block diagram illustrating a preferred embodiment of an Internet-related video clip storage and retrieval system according to the present invention. The system includes a user terminal 50 and a local SRU 51, which is linked by a communication line 52 to the Internet service provider's ("ISP's") head-end network communications interface 54. In a preferred embodiment, the interface 54 is an item commonly referred to as a network "terminal server." The interface 54 can also be a network router, switch, hub, computer, or other communication device, capable of supporting a large number of user terminals.

In one embodiment of the present invention, the terminal 50 is a personal computer running an HTML browser 82 with an audio-video decoding and playback "browser extension" 84 as described above. The browser 82 offers the necessary functionality to query and search data distributed across the Internet. The browser extension 84, in addition to offering audio-video display capabilities, possesses the logic required to access audio-video and other data organized and maintained by the local SRU 51, and to decompress audiovisual data derived from the present invention through the local SRU 51. As will be discussed below, the browser extension 84 further allows the user to interact with audio-video clips.

The system also includes a PIM 64 and one or more extended SRUs 66. In a preferred embodiment, the PIM 64 includes a modified Web server 68 and a database management module 69. All of the foregoing components, including the interface 54, are connected to a regional head-end backbone 80 within the user's home region 81. The backbone 80 may comprise any of a variety of known physical network components, such as Ethernet and FDDI linked together by assorted switches, bridges, routers, and hubs.

Also, on any computer connected to the backbone 80, one or more transient DSI processes 58 may be created. Such DSIs 58 may be created by the PIM 64, as required, for each user receiving audio-video content by the invention. The backbone 80 communicates with the Internet 56 via one or more network routers 112.

A neighboring region 89 is also shown. Like the home region 81, it includes an index manager ("IM") 88 hosting a Web server 93 and a database manager 91, at least one extended SRU 92, transient DSI processes 94, and a router 95. The router 95 is connected to the Internet 56. In addition, the neighboring region 89 is connected to the home region 81 by way of a high-speed dedicated line 96 between routers 112 and 95, allowing the SRUs and DSIs of the regions to communicate. The dedicated line 96 can be components of the existing Internet infrastructure or new communication lines added to supplement the Internet infrastructure. The neighboring region 89, like the home region 81, also has a head-end network communication interface 98 capable of supporting a large number of user terminals.

Note that the neighboring region 89 need not host its own IM 88. If the users local to the neighboring region 89 are low enough in number that the cost of maintaining an additional IM 88 is prohibitive, the PIM 64 for the home region 81 can be used to control the other components of the neighboring region 89 via the dedicated line 96. Furthermore, an "intranet"-like structure can be created by utilizing a single PIM 64 capable of controlling a number of regional groups of SRUs (such as extended SRUs 66 and 92).

The content provider's region 91 is also shown. It, too, contains an IM 90 hosting a Web server 83 and a database manager 85, at least one extended SRU 100, one or more transient DSIs 102, and a router 86, which is connected to the Internet 56. The dedicated line 96 can also link the content provider's region 91 to the other regions 82 and 89. A head-end network communication interface 104 connects the content provider's region 91 to a number of users, including the provider who will upload audio-video content.

The functions of the foregoing components will be discussed in further detail below.

A. Operation From the User's Perspective

The user terminal 50 is the device through which a user interacts with the delivery system. The terminal 50 typically is a personal computer, workstation, or television set top box. The terminal 50 is capable of running a browser 82 such as Netscape Navigator, and when prompted to do so by the browser 82, can also run an audio-video playback application as a "plug-in" or browser extension 84. The browser extension 84 receives audio/video data in protected and compressed form, and provides a mechanism for the user to receive, unprotect, decompress, and manipulate (i.e. play, rewind, stop, etc.) retrieved clips. The browser extension 84 is also capable of transmitting data back to the network 80, either through the browser 82 or independently. In a preferred embodiment, the browser extension 84 uses functions provided by the local SRU 51 to communicate with the delivery system of the invention.

A preferred embodiment of the present invention is contemplated for use as a premium subscription service. The end user subscribes to the premium service in order to be allowed access, and in one embodiment, the user is sent a configuration file to be stored at the user terminal 50. The configuration file contains a unique subscriber identification number, as well as the Internet address of the PIM 64 to be accessed by the user. The PIM 64 maintains information on the subscriber in a user database, namely the types of content subscribed to, user preferences, limitations on service, and billing information.

In one embodiment the user database contains the following information for each user:

| Item Name | Format | Description |
| --- | --- | --- |
| Counter | numeric | Primary index for the records. Each record represents one subscription account. |
| Player Number | numeric | Unique registration number for the browser extension 84 installed on the terminal 50. |
| User ID | numeric | Unique number that identifies each subscriber to the premium service. This is a multiple-valued item such that multiple User IDs can be associated with a single player 44. |
| User Ratings | numeric array | The content acceptability ratings for a specific user. |
| Services Subscribed | numeric array | The list of services to which the user's account has subscribed. |
| Subscription Date | date | The initial subscription date. |
| Expiration Date | date | The expiration date of the subscription. |
| Maximum Charge | numeric | The maximum monthly expense that can be incurred by the account. |
| Demographic Info | text array | Name, address, payment method, etc., used for billing. |
| Usage Info | text blob | A log of all video clips accessed, including date and time. This is for billing and user characterization. |

The PIM 64 also maintains information on the audio-visual clips stored on its extended SRUs 66 in a clip database (corresponding to the "audio-visual data index" previously discussed). In one embodiment, the clip database contains the following information for each clip:

| Item Name | Format | Description |
| --- | --- | --- |
| Counter | numeric | Primary index for the records. Each record represents one video clip. |
| Video ID | text | The globally unique name of the video clip, as specified above. |
| Extended SRUs | IP array | The IP addresses of all the extended SRUs 66 which contain the file. |
| Copyright | boolean | A flag to indicate that the file is copyrighted and must be protected. |
| Charge Mechanism | numeric | A code representing the mechanism for charging for the file (pay per view, one-time fee, etc.). |
| Charge Parameters | numeric array | The amount charged per use under the specified charge mechanism. |

-continued

| Item Name | Format | Description |
| --- | --- | --- |
| Expiration Date | date | Date after which the file is to be removed from the system. |
| Size of File | numeric | Size of the file, in bytes. |
| Date | date | Date the file was made by the content provider. |
| Time | time | Time the file was made by the content provider. |
| Category | numeric | The subject category of the file, used for load projections as discussed below. |
| Usage Count | numeric array | The historical frequency of clip access across days and hours, used for load projections. |
| Segment Info | text/numeric | If the file is segmented, this is the array of segment descriptors and pointers into the file. |
| Link Info | text/numeric | If the file has been annotated with links to other files, this is the array of link names, URLs, and pointers into the file. |

The PIM 64 also maintains information regarding each of its extended SRUs 66. Such information is stored in an SRU database as follows:

| Item Name | Format | Description |
| --- | --- | --- |
| Counter | numeric | Primary index for the records. There is one record for each extended SRU 66. |
| IP Address | IP | The Internet address of the SRU. |
| Current Performance | numeric | A value that represents the current performance of the SRU. |
| Theoretical Performance | numeric | A value that represents the theoretical maximum file delivery rate from the SRU. |

The user can, using the browser software 82 on the user terminal 50, browse the Web, accessing Web pages and selecting links as is known in the art. At some point, the user may wish to access a video clip handled by the subscription service. This is done by accessing a Web page on a content provider's Web server 83 or elsewhere. The desired clip may or may not be among those the user has subscribed to.

The content provider's Web server 83 can automatically, on the basis of a combination of the user's and the ISP's subscription parameters known to the content provider, create customized Web pages for each user. This procedure is known in the art. Preferably, the custom Web pages can be created on the ISP's regional Web server 68 (part of the PIM 64). Such an action can be undertaken at regular intervals, for example daily or whenever new content is made available to the system, or immediately upon access by a user. By accessing custom Web pages, the user will be informed of what subscription content is available, based on subscription information, contained in the user database discussed above. In this way, the ISP can create a "video guide" set of Web pages containing information the user is interested in, including subscribed-to video clips. The information contained in the ISP's "video guide" can be integrated with the information stored on the user's local SRU 51, thereby providing a seamless view of all content available. By selecting a link on the custom Web pages, the user can request a Web page containing subscription content, which will then be delivered by the system of the invention, even if it is not present within the user's region 81.

At that time, the ISP's Web server 68 (or other Web server 83 or 93) begins to transmit the Web page to the user terminal 50 via traditional means over the Internet 56. Accordingly, data moves from the server (e.g. server 83) to the corresponding router 86 to the Internet 56 (across potentially many nodes) to the user's ISP's router 112 to the head-end communication interface 54, and eventually to the terminal 50. A reference to a desired clip is embedded within the HTML of the Web page. When the user's browser 82, e.g. Netscape Navigator, receives the reference, supplied for example within an EMBED tag, an immediate request is made of the Web server 83 to transmit the embedded file.

The type or format of the embedded file is analyzed by the browser 82. Typically, this is indicated by an extension on the filename of the embedded file and is known in the art. If the desired file is a video clip, the local SRU 51 belonging to the terminal 50 and the browser extension 84 are invoked to receive the data. First, the local SRU 51 intercepts a video ID, a unique identifier specifying the selected clip, which is stored within the EMBED field in the Web page. The local SRU 51 first determines if the desired clip is already stored locally. If not, the local SRU 51 passes the video ID to the PIM 64 associated with the user's terminal 50. The local SRU 51 then awaits authorization from the PIM 64 to proceed with a data transfer.

The video ID consists of a multidimensional set of content-characterization coordinates plus a unique file name. The content coordinates enable a match with the regional IMs that have subscribed to that type of file, as will be discussed later.

In one embodiment, the video ID is constructed from the following portions: a text name of the file as defined by the content provider; the content provider's account number as provided by the organization running the subscription service; a category coordinate, possibly a representation of a hierarchical portion of a category tree, a geographic coordinate used to determine where the file is relevant (e.g. a region, state, or city); a time stamp, and a time period over which the file is relevant. The foregoing characteristics are known at the time a file is made available to the present system, and will be discussed in detail below.

In a preferred embodiment, the local SRU 51 passes the video ID to the PIM 64 in the following form: a "virtual URL" is constructed in the form "http://" plus the Internet address of the PIM 64, plus the user's subscriber ID number, plus the video ID. If the desired clip was located on the local SRU 51, then the virtual URL request will contain a further attribute specifying that a particular version of the file has already been located by the local SRU 51. The Netscape Navigator procedure NPN_GetURLNotify is available to accomplish sending this virtual URL to the PIM 64; the virtual URL is constructed to be in a format that will be accepted by Netscape Navigator and other network browsers. Upon receipt by the PIM 64, the virtual URL is decomposed into the video ID and subscriber ID components, which are then used to access the PIM's internal databases.

The PIM 64 checks the user's subscription rights in its user database, and if authorized and necessary, initiates a DSI process 58 to download the desired clip to the user's terminal 50. The PIM 64, having identified the clip corresponding to the video ID in its clip database, passes information to the DSI 58 regarding which extended SRUs 66 have the clip. The DSI oversees initiating the transfer process, ensuring that data is sent from the appropriate extended SRU 66 through the interface 54 to the user's terminal 50. The data is then downloaded from the appropriate extended SRU 66 to the user's terminal 50, at which time the local SRU 51 will intercept and transfer the data to the browser extension 84. The browser extension 84 can manipulate the data, store it in a storage area local to the terminal 50, or prepare it for viewing, as desired. If the PIM 64 determines that the user has not subscribed to the clip indicated by the selected video ID, no DSI process is invoked, and the local SRU 51 will be notified that either the clip must be downloaded directly from the Web page, as is traditionally done, or that the clip is entirely unavailable to that user.

Accordingly, the PIM 64 exercises a managerial function in the present invention. The PIM 64 includes a database with detailed information on the clips stored on the extended SRUs 66 associated with the PIM 64, for example, the location and filename of each clip, and attributes such as subject matter, rating, file size, expiration date, charge information, etc. For clips not on an extended SRU 66, another IM database maintains a reduced level of information about every IM, namely the Internet address of the IM and the content coordinates of all audio-video files that it maintains. For example, a library of "news:sports:baseball" clips might be maintained by several nearby and distant regional ISPs, including the one comprising the user's region 81. As previously indicated, the PIM 64 also has a user database which stores information on each of its users, namely subscription rights, authorized rating levels, accrued charges, charge limits, etc. Upon receiving a virtual URL from a user, indicating that the user wants to receive a clip having a specified video ID, the PIM 64 accesses the user database to determine whether the user is valid. The PIM 64 then accesses the clip database to determine, based on clip attributes, whether the user has valid subscription rights and is authorized to download the desired clip. At this time, the PIM 64 can also check to determine if downloading the desired clip will cause the user to exceed his charge limit.

If any of the foregoing database checks fail, the local SRU 51 will not receive authorization for the download, and the reason for the denial will be transmitted from the PIM 64 to the browser extension 84 and browser 82 user interface via the local SRU 51 to advise the user. If alternative versions of the desired clip are available which would be authorized given the user's subscription limitations, the user can be presented with the option to download the alternative versions.

Upon a determination by the PIM 64 that the user is authorized to receive the desired clip or an alternative version, it is determined as noted above whether the file embodying the clip has already been received and stored by the user's local SRU 51. If so, that version of the file is compared against the current version stored in the clip database on the PIM 64. If the file at the local SRU 51 is current, no download is necessary, and the locally stored version is transferred to the browser extension 84 for playback. If the file at the local SRU 51 is superseded, expired, or non-existent, steps are undertaken to download the proper file to browser extension 84 via the local SRU 51.

The download is initiated by the following procedure. The PIM 64 queries its clip database to determine on which extended SRUs 66 the desired clip is stored. If the clip is available on more than one extended SRU 66, the extended SRUs 66 are prioritized according to apparent load, with the least busy SRU 66 being given the highest priority. The PIM 64 then invokes a DSI 58, and provides it with a prioritized list of SRUs 66 that contain the data.

The DSI 58 invoked by the PIM 64 selects the highest priority (least loaded) SRU 66 from the list provided by the PIM 64. The DSI 58 then oversees the transfer from the extended SRU 66 to the terminal 50 via the interface 54 and local SRU 51; it does so by addressing the desired video clip with the Internet address of the user's local SRU 51. If the DSI 58 determines that the selected extended SRU 66 is overloaded or unable to respond (e.g. has not responded before a timeout), then the DSI 58 attempts to use the next-highest priority extended SRU 66 until the download is successful or until its possibilities are exhausted. At that time, information on download latency (i.e. which SRUs were unable to handle the download, and how long it took the successful SRU to begin the successful transfer) is sent back to the PIM 64, to allow the PIM 64 to dynamically recalculate priorities and apparent loads.

The DSI 58 is a software process which, as indicated above, directs and oversees the download process. The DSI process 58 can be hosted by the PIM 64, an SRU 66, or a standalone server connected to the PIM 64 and extended SRUs 66. To reduce bandwidth needs for the present invention, multiple requests for the same video clip from several users can be queued by the DSI 58 for a short period of time (for example, from one to fifteen seconds) before the clip is sent. During the queuing period, the DSI 58 can be receiving the clip data from the appropriate SRU 66. At the expiration of the queuing time, the DSI 58 can then multicast the clip to all of the users requesting the clip. To the extent that the path to all of the requesting users is the same (i.e. from the DSI to the head-end network interface 54), multicasting permits the use of only one transmission specifying the Internet addresses of all of the destination terminals. Multicast techniques will be discussed further below in the section on uploading new content.

Furthermore, the DSI 58 also supports data protection. To discourage distribution of copyrighted video clips by end-users of the present system, the DSI 58 will falsify key data fields of the audio-video clip, such as the MPEG "sequence_header" data structure, with data designed to make playback difficult. The correct video stream configuration data will be stored in an encrypted state (via known encryption methods, such as DES and RSA) in the MPEG system structure "user stream" as defined by the MPEG specification. Similarly, data derived from the user's ID will be added to the video data (namely MPEG DCT macro blocks) as noise at various points along the stream, thereby watermarking the file. The locations of this data is defined by a string of random numbers having a seed number stored within the encrypted portion of the user stream, as discussed above. The seed number, in conjunction with the clip title or video ID, is also archived in the user database belonging to the PIM for later reference should it be determined that the user stream and user data block have been removed from an MPEG file.

Note that not all files must be protected as indicated above; the existence of the scheme is partially contemplated as a deterrent factor. Furthermore, the watermarking enables authorities to track down copyright violators. As described above, the DSI 58 protects a clip based on specific user information obtained from the user database of the PIM 64. The user's browser extension 84 can unprotect the clip based on the same information. Accordingly, only the user requesting the clip can unprotect a protected clip.

The protection and watermarking steps are optional; the present invention contemplates that certain clips (e.g. advertising, public service announcements, and uncopyrighted material) can be left unprotected. This would be indicated by an attribute in the clip database. In this case, the DSI 58 will not protect the clip, and the clip can be received, stored, and viewed at the user terminal 50 without un-protection. Furthermore, the user could be free to redistribute such unprotected clips.

As indicated above, a system according to the present invention can have multiple index managers for a large number of concurrent users in disparate geographical areas. FIG. 4 illustrates three index managers: the PIM 64 belonging to the user's geographic region 81, an IM 88 belonging to a neighboring geographic region 89, and an IM 90 belonging to the content provider's region 91.

If the user's PIM 64 determines that the desired clip is not on any of the extended SRUs 66, and the PIM determines further that the user has subscription rights to access files from other regions, then the PIM 64 will query the closest IMs (e.g. IM 88) to determine if any of the remote SRUs 92 local to the other remote IMs have the desired clip. The query can be directed to those IMs which are likely to have the clip. Each IM, including the PIM 64, maintains a database of all other IMs connected to the system. For each IM, the database includes the Internet address of the IM, and information on the types of files stored by the IM's SRUs. The file type information can be stored in the form of content coordinate data, as previously discussed. Accordingly, by consulting the database, the PIM 64 can determine which IMs are likely to have the desired clip, and query only those IMs.

Each of the queried remote IMs, such as IM 88, responds with a message indicating whether its SRUs 92 contain the file, as well as information on the apparent load experienced by those SRUs 92. If the desired clip is found, the list of viable remote SRUs 92 will be transferred to the PIM 64. The PIM 64 will subsequently invoke a local DSI 58 with the SRU list to transfer the file to the user's terminal 50, as discussed above.

If the PIM 64, after having queried the neighboring remote IMs, is still unable to locate the desired clip on an SRU 66 or 92, the PIM 64 will then contact the source IM 90, where the content provider first uploaded the file. The Internet address of the source IM 90 is provided in the clip database of the PIM 64. If the desired clip is still current (i.e. not expired or superseded), it will exist on one of the SRUs 100 belonging to the source IM. A DSI 58 will then be invoked, as discussed above, to download the clip to the requesting user's local SRU 51 and terminal 50.

As the video clip data is received, it is stored on local SRU 51 and concurrently sent to the browser extension 84 to unprotect and display the video clip. As discussed above, the local SRU 51 stores the data in protected form. Consequently, it is protected against unauthorized duplication by an end user. If there is insufficient capacity available in the local SRU 51 to store a requested clip, the search and update logic of the local SRU 51, discussed above, can delete some of the least-recently-used clips already stored to make room for the new data.

In a preferred embodiment of the invention, the clip can be stored in an MPEG, AVI, or QuickTime file format. Such formats are well-known in the art, and are capable of using various compression schemes. For example, MPEG 1 and 2 use the discrete cosine transformation scheme, and MPEG 4 is proposed to use wavelet compression. AVI and QuickTime files may generally use such schemes as Indeo, Cinepack, fractal, or wavelet compression. Accordingly, the browser extension 84 of the invention must be able to interpret and decompress files of all types used in the invention, although not all compression formats and schemes noted above need be used.

If the user desires to view again a clip he has previously downloaded and that is still on the local SRU 51, the browser extension 84 can either allow the data to be unprotected and viewed again without cost, or cause the local SRU 51 to query the PIM 64 and update the billing records if the desired clip is one that must be paid for each time it is viewed.

As a consequence of the foregoing scheme, network load is minimized as compared to traditional digital video delivery systems. Many copies of a video clip can be downloaded in parallel to users in separate geographic regions. The copies of the clip exist on servers local to each user's region, and in general, are transmitted across fewer network nodes for each download. Furthermore, the extended SRUs for separate regions have unique communications paths, through each Internet service provider's head-end network, to the region's users. Accordingly, many separate downloads can be undertaken concurrently in separate geographical areas without impairing (or being impaired by) traffic conditions on the Internet 56 as a whole.

In addition, as will be discussed in detail below, each IM, including the PIM 64, tracks the demand within its region for all clips. Clips that are infrequently accessed within a particular region can be deleted from the extended SRUs 66 and reacquired from remote SRUs 92 or 100 only when necessary. In this way, local storage requirements are minimized. Accordingly, for the clips in highest demand, it is most likely that the data can be downloaded from an extended SRU 66; this is the fastest path. For lower demand clips, the nearest remote SRUs 92 will be the ones first queried. The response times for remote SRUs 92 can be determined by interactively testing the communications links (analogously to the "ping" program) to the remote SRUs 92 having the desired clip. The testing process is a combination of the following: the round-trip elapsed time for a test packet; available bandwidth determined by delivering and receiving several packets; and the capacity of the remote SRU 92 as reported.

B. Uploading and Distributing New Content

The content provider is responsible for maling content, namely video clips, available to the present system. A software tool is provided for that purpose. It is contemplated that the content provider will begin with a video clip in MPEG format (or another known digital video format). The content will then use the software tool to assign a video ID, a rating, language and content attributes, expiration dates, and other attributes to the clip, which will then be stored within the file representing the clip. The MPEG file can be one having multiple video and audio streams supporting various playback configurations. For example, different versions can be provided in different languages, having different playback resolutions, having geographically specific information (such as telephone numbers), and having various rating levels (e.g. by cutting out or editing objectionable portions within some of the versions). In a preferred embodiment of the invention, the data in the user database belonging to the PIM 64 is used to establish which version of a clip is desired by the user; upon download, the DSI 58 is directed by the PIM 64 to decompose the clip file and send the proper version.

The content attributes attached to the clip are represented in the form of a hierarchy of subjects. For example, a clip could be annotated as belonging to the content areas "News:Sports:Baseball:Yankees." All four of these content areas would then be indicated in the clip database of the PIM 64, as well as within the clip file itself. A wide variety of content areas would be pre-established by the organization providing the subscription service, for use by the content providers prior to uploading clips. It is further contemplated that content providers having specialized needs could add to the hierarchical tree of subjects, with or without approval of the subscription service provider.

As discussed above, the content provider will use the software tool to attach certain attributes to a clip file. The software tool will also communicate with a master database of video ID numbers to ensure that each clip uploaded, no matter from where, will have a unique video ID consistent with the present invention. The software tool will then upload the clip to the content provider's Web server 83, allowing the clip to be registered with the present invention as described in detail below.

When a content provider changes the content of a video clip, or makes a new clip available, the clip is uploaded to the content provider's Web server 83, and information about the data file representing the clip is sent to the IM 90 local to the content provider (the "source M" previously discussed). The clip is then distributed to regional IMs and SRUs as follows.

The source IM 90 registers the clip in its own clip database, storing information including the name, date, time, video ID, rating, copyright information, subscription information, content information, and other attributes of the clip as the clip is transferred from the content provider to the IM 90. The source IM 90 then invokes the IM's storage management logic to copy the file to at least one of its extended SRUs 100. The particular SRU or SRUs chosen can depend on load determinations previously made by the source IM 90, as generally discussed above. The Internet address of the chosen SRU 100 is also stored in the clip database of the source IM 90.

The source IM 90 then transfers the updated file to other IMs throughout the system. As discussed above, the IM 90 maintains a database of all other IMs in the system, and the types of content such other IMs maintain. The receiving IMs accept the new clip and subsequently transfer it to their respective SRUs. By way of the foregoing mechanism, an updated video clip will be sent only to those IMs that would store such a file. The data transfer includes all of the information listed above, plus the Internet address of the source IM 90. The data can be sent by either multicasting techniques or by propagation, whereby each IM relays the message to all of its neighboring IMs, except the one from which the message was received. The multicasting method is preferred, as it results in less utilization of network bandwidth. The propagation method, though robust, can result in a slow response time for data updates if many IMs require the new data.

Each IM has a content database of which categories of content are to be made available to the subscribers in its region, reflecting selections made by the Internet service provider hosting the IM. The content categories are represented in the form of content characterization coordinates, as discussed above. Only those clips in the selected categories are stored on the SRUs belonging to the IM. When an IM, such as the PIM 64, receives a message about the availability of the new or changed clip, it checks the content database to determine whether it should acquire the file. If so, the IM will send a message to the originating IM 90 indicating that it will store the clip.

Alternatively, content can be distributed without first sending a message determining which IMs will store the clip. To do so, the originating IM will access its IM database to determine which IMs have content coordinates that would include the new or updated clip. The list of IMs satisfying that query can then be used for distribution of content.

To distribute the clip to all requesting IMs, the originating IM 90 utilizes its storage management logic to handle sending the clip. The originating IM 90 first reserves a multicast Internet address as designated in the Internet multicast standard. The IM 90 then sends a message to each requesting IM, requesting that they all join the multicast group. When the clip is then sent by the DSI 102 to the reserved multicast Internet address, each IM will receive the file and disseminate it to its SRUs according to its own criteria.

Accordingly, each IM (such as PIM 64) then locates the least loaded extended SRU to be used for storing the clip (by the means previously discussed) and then again invokes its storage management logic to copy the clip to one of its extended SRUs 66. The PIM 64 also checks to determine if it already has an older version of the clip. If so, the storage management logic will delete the old version before copying the new version to an extended SRU 66. If the clip has several portions or segments (e.g. in different languages or having regionally specific information), only those portions indicated as relevant by the IM's content database need be stored. For example, if a particular ISP has no Spanish-speaking users, then Spanish language versions of clips need not be stored locally.

The content provider can also instruct the system to remove all copies of a specified clip. To do so, a message embodying the instruction can be sent to the content provider's IM 90. The message will then be propagated throughout the system, as indicated above for new and changed clips. When each IM receives the instruction to remove a particular clip, it will query its clip database to determine if any of its extended SRUs are storing the clip. If so, the IM's storage management logic will be invoked to delete all copies of the clip from the appropriate SRUs.

Each IM, including the PIM 64, also performs its own maintenance on the clip database and the data stored on its extended SRUs 66. Periodically, the PIM 64 can check to determine if any of the clips in the clip database have expired, or if any of the clips have not been accessed within a specified time period (e.g. one hour, one day, one week, or one month). If either is the case, the PIM 64 can invoke its storage management logic to delete the clips from the appropriate SRUs 66.

C. Dynamic Load Management

To optimize performance, the system of the present invention incorporates several means of reducing communications bottlenecks: (1) preloading and distribution of files based on predicted usage; (2) dynamic load balancing; (3) automatic file replacement. The means discussed below are in the nature of on-demand parallelism, or enforcing the use of multiple communication paths to reduce bottlenecks. However, it should be noted that other load management techniques are used by the invention, for example the prioritized list of extended SRUs 26 created by the PIM 64, as discussed above.

(1) Preloading and Distribution

The PIM 64 periodically (e.g. hourly) collects and saves in its database the frequency with which each file on its extended SRUs 66 is requested as a function of day of week and time of day. The frequency of file access in each of numerous pre-defined categories (e.g. sports, automobiles, music, etc.) is tabulated and saved, as is the frequency of access of each individual file, and the user's communication link speed used for each previous download. The above information is used to predict future usage.

In a preferred embodiment of the present invention, three categories of prior usage are utilized to predict the number of times each given clip will be downloaded. First, data based on the historical demand of clips in the clip's subject matter category, over the same hour and same day from previous weeks, is linearly extrapolated to predict that category's demand at the present day and time. This first factor, by way of example, contributes a fraction of the final weighting, ideally 20–40%. Second, data based on the particular clip (or its predecessors) over the corresponding hour on previous days is linearly extrapolated to predict that clip's demand at the present day and time. This second factor contributes 20–30% to the final weighting. Third, data based on the particular clip (or its predecessors) over the period directly preceding the present hour is linearly extrapolated to predict the clip's demand. This third factor contributes the remaining fraction, 30–60%, to the finalweighting.

These three factors are combined to estimate load, i.e. how many times each clip will be downloaded in the upcoming period. At the end of each period, projected load can be compared to actual load, and techniques known in the art (such as neural networks) can be applied to improve the weightings for future periods.

Based on the projections discussed above, the PIM 64 estimates the SRU 66 bandwidth required to accommodate the predicted downloads. This estimate can be made, for example, by multiplying the size of each file by the number of expected downloads in the period. If the projected required bandwidth is less than a threshold (e.g. 10–50%) of the capacity of a single SRU 66, then no load balancing need be undertaken. However, if the projected required bandwidth is higher, then the files must be distributed over a sufficient number of extended SRUs 66 until none exceeds the threshold. This is accomplished by evenly distributing the highest projected usage file over the number of SRUs sufficient to accommodate the number of projected simultaneous downloads for the file at the users' projected download speeds. The distribution is performed by the storage management logic invoked by the PIM 64 desiring to distribute files.

Where there are more copies of files than are predicted to be needed, the PIM 64 will use the storage management logic to delete the excess files from those SRUs 66 with the highest predicted loads (based on clips other than the one being deleted).

(2) Dynamic Load Balancing

Dynamic load balancing of the extended SRUs 66 is performed to minimize the chances of any particular SRU 66 becoming a bottleneck and to maximize bandwidth utilization during periods of peak load. Load balancing in accordance with the Internet embodiment of the present invention is carried out generally as set forth above for the invention as a whole, and in specific instances as described below.

The PIM 64 maintains current performance information about each of its extended SRUs 66. This information is obtained from determinations of when the DSI 58 initiates and concludes the transfer of a file from an SRU 66, as discussed above.

If any SRU has a load approaching a threshold limit (e.g. 80%) of its theoretical capacity, the PIM 64 checks whether this is due to a few clips receiving a disproportionately large portion (e.g. greater than 10%) of download requests. If so, the PIM 64 invokes its storage management logic to transfer the files to another, e.g. the least-loaded SRU 66.

If the expected or current demand for a particular file or small group of files exceeds a threshold capacity (e.g. 30–50%) of all of the extended SRUs 66 within a region, the PIM will attempt to move these clips into a RAM (random access memory) buffer 106 accessible by the DSI 58. The use of the RAM buffer 106 will reduce the quantity of disk accesses required to retrieve the highest demand clips. The delivery capacity of the SRUs 66 maintained by the PIM 64 will then be updated to reflect their increased capacity.

If all of the extended SRUs 66 within a region are unable to meet the demand of the current number of users, then the system can make use of remote SRUs belonging to neighboring IMs, such as IM 88, as follows. After the DSI 58 has exhausted its attempts to acquire data from the local SRUs, as generally described above, the DSI 58 will re-query the PIM 64 to obtain a second list of viable SRUs. As discussed above, the PIM 64 will query the appropriate remote IMs to receive such information.

Because of the invention's dynamic load balancing, should an extended SRU 66, remote SRU 92 or 100, or remote IM 88 or 90 fail, alternate servers and communication paths are automatically available to service the user. Data is maintained redundantly on multiple physical servers. Each region, including its IM and extended SRUs, is a self-contained system for managing and distributing video clips; there is no centralized data management function. Consequently, a failure in one region does not catastrophically impact any other region.

Furthermore, as the number of end users to whom the ISP sells the premium service increases, and as the number of available video clips increases, the invention offers potentially unlimited growth capacity. The number of physical extended SRUs 66, as well as the disk capacity of each extended SRU 66, can be increased in order to store more data. Additional IMs can be added to service additional geographical regions or to subdivide overloaded existing regions. To increase the number of parallel data transfers, more than one DSI 58 can coexist on shared physical servers or on separate servers within a region.

(3) Automatic File Replacement

The automatic file replacement attributes of the invention are discussed above in the section on uploading and distributing new content.

D. Clip Segmentation

One embodiment of the present invention can accommodate video clip segmentation. In other words, a clip can be made up of two or more segments. After selecting a segmented clip, the requesting user can be presented with an index of segments within the clip, and choose to download one, several, or all of the segments.

To accomplish this, the content provider first edits the video clip using the software tool described above, so that specific frames of the clip are identified by consecutive index numbers. Segment data is attached to the clip and stored within the file. The segment data includes, for each index number, a textual name or description of the indexed frame and the starting and ending byte counts of the indexed segment. In a preferred embodiment, the user stream of an MPEG file is used to include the segment data; in this way, MPEG file compatibility is maintained for use by other players.

Specifically, segment data will be included within an MPEG file as follows. An MPEG file may possess a number of video streams, a number of audio streams, a single MPEG format stream, and a single user stream. The streams are all tied together with parameters linking events for use at the same "presentation time." Accordingly, segment data of the invention can be merged into the user stream and tagged to occur at a specific presentation time corresponding to a desired video or audio event. This characteristic is useful for synchronization purposes.

Furthermore, the user stream can include multiple sub-streams. A preferred embodiment of the present invention will have at least two user sub-streams: a segment sub-stream and a protection sub-stream. The segment sub-stream will contain the index numbers and corresponding data discussed above, as well as a table of contents to the segments. The protection sub-stream will contain the protection and watermarking data discussed above. By the use of multiple specially-defined sub-streams within the user stream of an MPEG file, MPEG viewers other than the browser 82 or browser extension 84 of the invention can be used to view unprotected video clips downloaded by the present invention. Such viewers will simply ignore the additional information.

Unsegmented clips are generally stored on an SRU 66 as a contiguous file on a hard disk belonging to an SRU 66. Segmented clips, however, are stored as separately accessible records. The PIM 64 then tracks, in its clip database, which segments are stored on which SRUs 66. The segment data also remains within the MPEG file as discussed above.

When the user requests to view a segmented clip, the clip is identified by video ID and located by the PIM 64 as previously discussed for unsegmented clips. However, before the video data is downloaded, the clip segment data is downloaded to the user terminal 50 for display by the browser extension 84. The user can then select the specific segments he wishes to download. The segment numbers of the identified segments are then reported by the browser extension 84 to the DSI 58, which then downloads only the requested segments from the appropriate local SRUs 66 to the terminal 50 via the local SRU 51. If the segments are stored on separate SRUs 66, the DSI 58 can be loading segments concurrently from the separate SRUs 66 in preparation for download to the user terminal 50.

There are other uses for the segment data, as well. The content provider can tie additional information to frames or segments of a clip. This information can be stored in an additional control sub-stream (part of the MPEG user stream previously discussed). For example, the segment data can include additional video IDs or URLs identifying other clips or HTML files. When the clip is downloaded and played by the user's browser extension 84, the browser extension 84 can then display the associated video ID, URL, or text describing the link. The user can select one or more of these links, thereby directing the browser 82 and/or browser extension 84 to acquire the associated information by way of the present invention or by traditional means over the Internet 56.

The segment data can also contain embedded instructions for the browser extension 84. Such segment data can be included in an additional object sub-stream made part of the MPEG user stream, as discussed above. For example, by including predefined codes associated with particular frames or segments of the clip, the browser extension 84 can be instructed to add graphical objects, text, or other controls to the display. Additional computing functionality can be added in the form of embedding terminal-independent computer programs, such as those written in the Java programming language, into the segment database. As the clip is received by the browser extension 84, the program code is also received and interpreted, and can be passed to the browser 82. At appropriate times, the browser extension 84 can then interact with the browser 82 to cause the appropriate actions to be taken.

The segments can each have their own attributes, such as content rating and language. Such attributes can be stored in the segment sub-stream of an MPEG file, as discussed above. Attribute information can be used by the PIM 64 on a persegment basis to determine which segments are available to a particular user. Only those segments available will be shown on the browser extension 84 as downloadable. The PIM 64 will instruct the PIM 18 to download only those segments indicated by the information in the user database. Those segments not having relevant data are ignored. Thus, the clip file stored on the extended SRUs 66 is dynamically decomposed to eliminate undesired content and reconstructed to provide the desired video clip to the user.

Note that the segmented files can be stored as segments on the content provider's Web server 83, as well. When the present system is not available (e.g., the user has insufficient subscription rights or a particular clip has not been stored on any SRUs), a Web page can be used to list the individual segments, with the segments selectable as separate clips in a traditional manner over the Internet 56.

E. Subscription Control and Management

As discussed above, the present invention can be a premium service for subscribers. Consequently, the following subscription management capabilities are included when needed.

To receive access to the present invention, the end user must subscribe to the premium service. The subscription may be free. The ISP provides the user with a sign-up program (which may be implemented as a Web page on the ISP's Web server 68 having forms to receive data input). The user is queried as to price limits for monthly charges, and provides billing information (such as a credit card number). User configuration data is collected, such as the desired playback quality and resolution of video clips. The user also establishes acceptable content restrictions for use in the ratings system discussed below. By using the sign-up program or accessing the sign-up Web page in the future, the user has access to the configuration data to alter it as desired.

For content that is available on a subscription basis, the invention limits access to those users who are designated as subscribers to the content. Users may directly subscribe to particular content, or ISPs may subscribe for their end users. In either case, the PIM 64 maintains in its user database a listing of all those authorized subscribers who are connected to the PIM 64, limiting downloading of clips through the invention to those who are authorized within that region.

Each video clip can also be annotated with a date or elapsed time after which it will expire; such information will be stored in the clip database belonging to the PIM 64. The PIM 64 will then disallow transmission of an expired file to any user's browser extension 84, and can optionally disallow replaying (i.e. decline a request to un-protect) a clip stored locally at the user's terminal 50.

Certain clips can be made available on a "pay per view" basis. In such a case, each download (or, optionally, each viewing) will be tracked by the PIM 64; the user's account accrues an incremental charge on the basis of the download or viewing. The browser extension 84 can alert the user to the requested charge in order to get authorization for the clip's download.

A mechanism is built into the invention to avoid abuse of the "pay per view" billing system. With a pay per view system, there is a potential for a user to over-use the system, accruing an unreasonably high level of charges. Consequently, the user or another person can pre-program the browser extension 84 to enforce a cost limit; this cost limit would be password protected. Prior to downloading a file, the PIM 64 communicates the total potential cost to the browser extension 84. If the total charge exceeds the player's limit, then the download is disallowed, or the user is asked to confirm the transaction by entering the password.

An alternate form of billing can be made in the form of subscription fees. The content provider can require that a periodic subscription fee be paid for a user to receive access to a selected group of video clips. Such subscribed access can then be unlimited or limited as the content provider or ISP desires. This billing scheme can be used in conjunction with the "pay per view" scheme disclosed above; some clips might be free with an appropriate subscription, while others are still available only through pay per view. If certain downloaded clips had to be retrieved from remote regions 89 or 91, then a "long distance" charge can be assessed. The PIM 64 can track the accrual of periodic subscription fees and apply the charges to the accounts of the users in its region 81.

As suggested above, a subscription can be limited to certain subject areas of interest. The user can use the browser extension 84 and browser 82 to search the Web for topics of interest; such search capabilities are known in the art. When a collection of desired clips has been determined, the user can use the browser extension 84 to submit a proposed group of clip requests to the PIM 64. The PIM 64 can then respond with information on proposed subscription terms and fees to accommodate the query results. The user can accept or reject such terms, and upon acceptance, the user's account will be updated accordingly.

The present system also accommodates various ratings for use in, for example, parental control. When content is created or uploaded to the content provider's Web server 83 and its IM 90, the content provider can assign a rating level, which will be stored in the clip database of the IM 90 (and the PIM 64), as well as optionally in the Web page containing the clip. The player can be pre-programmed by the user or another person to disallow downloading video clips having ratings higher than a specified limit; the rating control programming can be protected by password. Each clip can be rated, for example, by a two-dimensional rating matrix consisting of a characteristic and severity. In one embodiment, the characteristics would be nudity, pornography, language, and violence; levels of severity can be, for example, from one to five.

Under the rating control mechanism, when a video clip is requested by the user, the PIM 64 is provided the rating information either from the Web page (as part of the tag embedding the video ID) or from the clip database on the PIM 64, after the PIM 64 has identified the clip. The user's rating control limit is sent to the PIM 64 as part of the virtual URL constructed from the video ID. The PIM 64 can then allow or deny the download based on that information.

Example 8—Alternative Embodiments

In view of the above explanation of the exemplary system, it will be appreciated that embodiments of the present invention may be employed in many different applications to deliver large quantities of time-critical data across a network. Specifically, it should be noted that the foregoing disclosure is not limited to video clips, with or without audio, and would also perform well for audio-only clips, and computer data, among other data types. Similarly, the functional elements disclosed herein are not limited structurally to the configuration shown; it is contemplated that the elements, such as the PIM 64 and the DSI 58, among others, can share hardware on a single server, if such is desirable or necessary in a particular embodiment. Alternatively, a functional element may be split over several pieces of hardware to improve performance, as is known in the art. Also, note that while only three regions are depicted and disclosed in FIG. 4, the present invention is scalable, with many regions connected by the Internet 56 (or any other network) and high-speed lines (like line 96); each region is likewise expected to have a large number of users connected to its respective head-end network interface 54.

While certain exemplary structures and operations have been described herein, the appropriate scope hereof is deemed to be in accordance with the claims as set forth below.

What is claimed is:

1. A data sequencing interface for collecting, managing and buffering audio-visual data which is transmitted to the data sequencing interface from extended and remote storage locations for downloading to a user, comprising:

a first communications interface between an index manager and the data sequencing interface for communicating the exact location of audio-visual segments stored at one or more of the extended and remote storage locations;

a second communications interface between the extended and remote storage locations and the data sequencing interface for transmitting the downloaded audio-visual segments to transmit buffers of the data sequencing interface;

audio-visual sequencing logic for sequentially requesting each audio-visual segment from each extended and remote storage location identified as containing the audio-visual segment until the audio-visual segment is retrieved;

storage management logic for managing the location of each retrieved audio-visual segments; and a third communications interface between the data sequencing interface and the user over which the retrieved audio-visual segments is transmitted for the eventual download to the user.

2. The data sequencing interface as in claim 1 wherein:

the first and second communications interface are very high speed; and the third communications interface is a high speed.

3. The data sequencing interface as in claim 2 wherein each very high speed interface has a minimum bandwidth of at least about 100 MBaud, and each high speed interface has a minimum bandwidth of at least about 56 Kbaud.

4. The data sequencing interface as in claim 1 wherein the storage management logic comprises:

means for determining whether an audio-visual segment is retrieved from either one of the remote storage location or from the extended storage location;

means for comparing the number of times an audio-visual segment is retrieved from a remote storage location with the number of times the least requested audio-visual segment is retrieved from the extended storage location;

means for copying, from the remote storage location to the extended storage location, an audio-visual segment which is retrieved more often from the remote storage location than from the extended storage location; and means for removing the least requested audio-visual segment from the extended storage location and placing the least requested audio-visual segment onto one of the remote storage locations.

5. The data sequencing interface as in claim 1 wherein the audio-visual sequencing logic comprises:

means for determining whether an audio-visual segment requested from either the extended or remote storage location cannot be retrieved because of other requests for audio-visual data from that extended or remote storage location;

means for requesting the audio-visual segment from another extended or remote storage location;

means for communicating which storage location provided the audio-visual segment to the index manager.

* * * * *